US012514756B1

(12) United States Patent
Chen et al.

(10) Patent No.: US 12,514,756 B1
(45) Date of Patent: Jan. 6, 2026

(54) DERMAL PATCH AND SYSTEMS, KITS, AND METHODS ASSOCIATED THEREWITH

(71) Applicant: Covidien LP, Mansfield, MA (US)

(72) Inventors: Mingfei Chen, Santa Rosa, CA (US); Gerald N. Hodgkinson, Killingworth, CT (US); Monideepa Chatterjee, North Haven, CT (US); Emily E. Jacobs, Durham, CT (US); Brian C. Graham, Santa Rosa, CA (US); Colin D. Gack, Windsor, CA (US)

(73) Assignee: Covidien LP, Mansfield, MA (US)

( * ) Notice: Subject to any disclaimer, the term of this patent is extended or adjusted under 35 U.S.C. 154(b) by 0 days.

(21) Appl. No.: 18/909,566

(22) Filed: Oct. 8, 2024

(51) Int. Cl.
A61F 13/0203 (2024.01)
A61F 13/00 (2024.01)
A61L 15/44 (2006.01)
A61L 26/00 (2006.01)

(52) U.S. Cl.
CPC .......... *A61F 13/0226* (2013.01); *A61L 15/44* (2013.01); *A61L 26/0066* (2013.01); *A61F 2013/00906* (2013.01)

(58) Field of Classification Search
CPC ........................................................ A61L 15/44
See application file for complete search history.

(56) References Cited

U.S. PATENT DOCUMENTS

| | | |
|---|---|---|
| 3,814,095 A | 6/1974 | Lubens |
| 4,608,249 A | 8/1986 | Otsuka et al. |
| 4,826,945 A | 5/1989 | Cohn et al. |
| 5,298,258 A | 3/1994 | Akemi et al. |
| 5,330,452 A | 7/1994 | Zook |
| 5,332,576 A | 7/1994 | Mantelle |
| 5,429,589 A | 7/1995 | Cartmell et al. |
| 5,536,263 A | 7/1996 | Rolf et al. |
| 5,613,958 A | 3/1997 | Kochinke et al. |
| 5,698,213 A | 12/1997 | Jamiolkowski et al. |
| 5,700,583 A | 12/1997 | Jamiolkowski et al. |
| 5,714,165 A | 2/1998 | Repka et al. |
| 5,741,510 A | 4/1998 | Rolf et al. |
| 5,762,620 A | 6/1998 | Cartmell et al. |
| 5,810,786 A | 9/1998 | Jackson et al. |
| 5,827,529 A | 10/1998 | Ono et al. |
| 5,922,340 A | 7/1999 | Berde et al. |
| 5,958,446 A | 9/1999 | Miranda et al. |
| 6,005,020 A | 12/1999 | Loomis |
| 6,045,824 A | 4/2000 | Kim et al. |
| 6,046,187 A | 4/2000 | Berde et al. |
| 6,074,660 A | 6/2000 | Jamiolkowski et al. |
| 6,096,333 A | 8/2000 | Rolf et al. |
| 6,096,334 A | 8/2000 | Rolf et al. |
| 6,110,488 A | 8/2000 | Hoffmann |
| 6,120,792 A | 9/2000 | Juni |
| 6,254,883 B1 | 7/2001 | Jarnstrom et al. |
| 6,299,902 B1 | 10/2001 | Jun et al. |
| 6,348,212 B2 | 2/2002 | Hymes et al. |
| 6,361,790 B1 | 3/2002 | Rolf et al. |
| 6,383,511 B1 | 5/2002 | Cassel |
| 6,461,644 B1 | 10/2002 | Jackson et al. |
| 6,545,097 B2 | 4/2003 | Pinchuk et al. |
| 6,599,525 B2 | 7/2003 | Scamilla Aledo et al. |
| 6,645,521 B2 | 11/2003 | Cassel |
| 6,669,953 B1 | 12/2003 | Kamiyama |
| 7,041,868 B2 | 5/2006 | Greene et al. |
| 7,357,940 B2 | 4/2008 | Richard et al. |
| 7,395,111 B2 | 7/2008 | Levin et al. |
| 7,625,620 B2 | 12/2009 | Kose |
| 7,833,548 B2 | 11/2010 | Chappa et al. |
| 8,092,818 B2 | 1/2012 | Richard et al. |
| 8,105,624 B2 | 1/2012 | Shudo |
| 8,129,359 B2 | 3/2012 | Herzberg et al. |
| 8,182,835 B2 | 5/2012 | Kim et al. |
| 8,211,455 B2 | 7/2012 | Schwarz |
| 8,337,883 B2 * | 12/2012 | Yum .................. A61K 9/7084 514/315 |
| 8,383,149 B2 | 2/2013 | Audett et al. |
| 8,579,924 B2 | 11/2013 | Stopek et al. |
| 8,632,839 B2 | 1/2014 | Stopek et al. |
| 8,747,888 B2 | 6/2014 | Kydonieus et al. |
| 8,758,798 B2 | 6/2014 | Stopek et al. |
| 8,758,799 B2 | 6/2014 | Stopek et al. |
| 8,758,800 B2 | 6/2014 | Stopek et al. |
| 8,815,281 B2 | 8/2014 | Kanios et al. |
| 8,834,921 B2 | 9/2014 | Kim et al. |
| 8,864,727 B2 | 10/2014 | Lee |
| 8,907,153 B2 | 12/2014 | Zhang et al. |
| 8,920,843 B2 | 12/2014 | Sawan et al. |
| 8,920,867 B2 | 12/2014 | Stopek et al. |
| 8,932,621 B2 | 1/2015 | Stopek et al. |
| 8,956,644 B2 | 2/2015 | Yum et al. |
| 8,960,128 B2 | 2/2015 | Sheil et al. |
| 8,980,302 B2 | 3/2015 | Stopek et al. |
| 9,005,308 B2 | 4/2015 | Stopek et al. |
| 9,006,193 B2 * | 4/2015 | Stayton .............. A61K 47/549 514/23 |
| 9,114,199 B2 | 8/2015 | Richard et al. |
| 9,125,814 B2 | 9/2015 | He et al. |
| 9,144,634 B2 | 9/2015 | Stopek et al. |
| 9,155,711 B2 * | 10/2015 | Choi .................. A61K 31/445 |
| 9,155,712 B2 | 10/2015 | Kanios et al. |
| 9,179,994 B2 | 11/2015 | Stopek et al. |
| 9,192,575 B2 | 11/2015 | Kim et al. |
| 9,198,877 B2 | 12/2015 | Jackson et al. |
| 9,205,052 B2 | 12/2015 | Kim et al. |
| 9,205,062 B2 | 12/2015 | Jackson et al. |
| 9,205,090 B2 | 12/2015 | Audett et al. |
| 9,211,175 B2 | 12/2015 | Stopek et al. |
| 9,216,240 B2 | 12/2015 | Broom et al. |
| 9,254,263 B2 | 2/2016 | Sundberg et al. |
| 9,308,187 B2 | 4/2016 | Hatanaka et al. |
| 9,364,310 B2 | 6/2016 | Stopek et al. |
| 9,585,838 B2 | 3/2017 | Hartounian et al. |
| 9,642,946 B2 | 5/2017 | Stopek et al. |
| 9,662,414 B2 | 5/2017 | Wood et al. |
| 9,675,562 B2 | 6/2017 | Zhang et al. |
| 9,675,789 B2 | 6/2017 | Chen et al. |
| 9,693,995 B2 | 7/2017 | Liu et al. |
| 9,730,892 B2 | 8/2017 | Schutt et al. |

(Continued)

*Primary Examiner* — Gina C Justice
(74) *Attorney, Agent, or Firm* — Weber Rosselli & Cannon LLP

(57) ABSTRACT

The present disclosure describes a dermal patch including at least a support layer and a medicament depot including a medicament. The dermal patch is configured to support, protect, and/or medicate a wound during a healing process.

15 Claims, 11 Drawing Sheets

(56) References Cited

U.S. PATENT DOCUMENTS

| | | | |
|---|---|---|---|
| 9,737,482 | B2 | 8/2017 | Schutt et al. |
| 9,737,483 | B2 | 8/2017 | Schutt et al. |
| 9,757,336 | B2 | 9/2017 | Schutt et al. |
| 9,801,945 | B2 | 10/2017 | Ottoboni et al. |
| 9,861,590 | B2 | 1/2018 | Stopek et al. |
| 9,919,080 | B1 | 3/2018 | Chen et al. |
| 10,010,648 | B2 | 7/2018 | Wood et al. |
| 10,034,858 | B2 | 7/2018 | Liu et al. |
| 10,039,709 | B2 | 8/2018 | Alur et al. |
| 10,098,957 | B2 | 10/2018 | Ottoboni et al. |
| 10,206,769 | B2 | 2/2019 | Elachchabi et al. |
| 10,213,510 | B2 | 2/2019 | Ottoboni et al. |
| 10,231,938 | B2 | 3/2019 | Kanios et al. |
| 10,299,966 | B2 | 5/2019 | Pigg |
| 10,300,019 | B2 | 5/2019 | Steendam et al. |
| 10,398,648 | B2 | 9/2019 | Schutt et al. |
| 10,406,115 | B2 | 9/2019 | Zhang et al. |
| 10,406,116 | B2 | 9/2019 | Zhang et al. |
| 10,426,739 | B2 | 10/2019 | Knutson |
| 10,525,170 | B2 | 1/2020 | Havenstrite et al. |
| 10,603,401 | B2 | 3/2020 | Munro et al. |
| 10,632,199 | B2 | 4/2020 | Ottoboni et al. |
| 10,687,986 | B2 | 6/2020 | Quintero |
| 10,806,700 | B2 | 10/2020 | Broom et al. |
| 10,898,575 | B2 | 1/2021 | Ottoboni et al. |
| 10,898,934 | B2 | 1/2021 | Valia |
| 10,987,316 | B2 | 4/2021 | Liao et al. |
| 11,033,495 | B1 | 6/2021 | Hall et al. |
| 11,058,609 | B2 | 7/2021 | Pang et al. |
| 11,083,730 | B2 | 8/2021 | Ottoboni et al. |
| 11,179,336 | B1 | 11/2021 | Hall et al. |
| 11,185,506 | B1 | 11/2021 | Hall et al. |
| 11,260,150 | B2 | 3/2022 | Havenstrite et al. |
| 11,278,494 | B1 | 3/2022 | Hall et al. |
| 11,304,904 | B1 | 4/2022 | Hall et al. |
| 11,311,486 | B1 | 4/2022 | Hall et al. |
| 11,357,727 | B1 | 6/2022 | Hall et al. |
| 11,382,868 | B2 * | 7/2022 | Choi ............ A61K 31/60 |
| 11,413,350 | B2 | 8/2022 | Ottoboni et al. |
| 11,426,348 | B2 | 8/2022 | Hall et al. |
| 11,452,691 | B1 | 9/2022 | Hall et al. |
| 11,458,113 | B2 | 10/2022 | Alur et al. |
| 11,491,116 | B2 | 11/2022 | Matsuzawa et al. |
| 11,590,262 | B2 | 2/2023 | Greenhalgh |
| 11,607,407 | B2 * | 3/2023 | Babul ............ A61K 47/08 |
| 2004/0242770 | A1 * | 12/2004 | Feldstein ............ C09J 131/04 |
| | | | 525/54.3 |
| 2016/0317465 | A1 * | 11/2016 | Shinoda ............ A61K 31/325 |

* cited by examiner

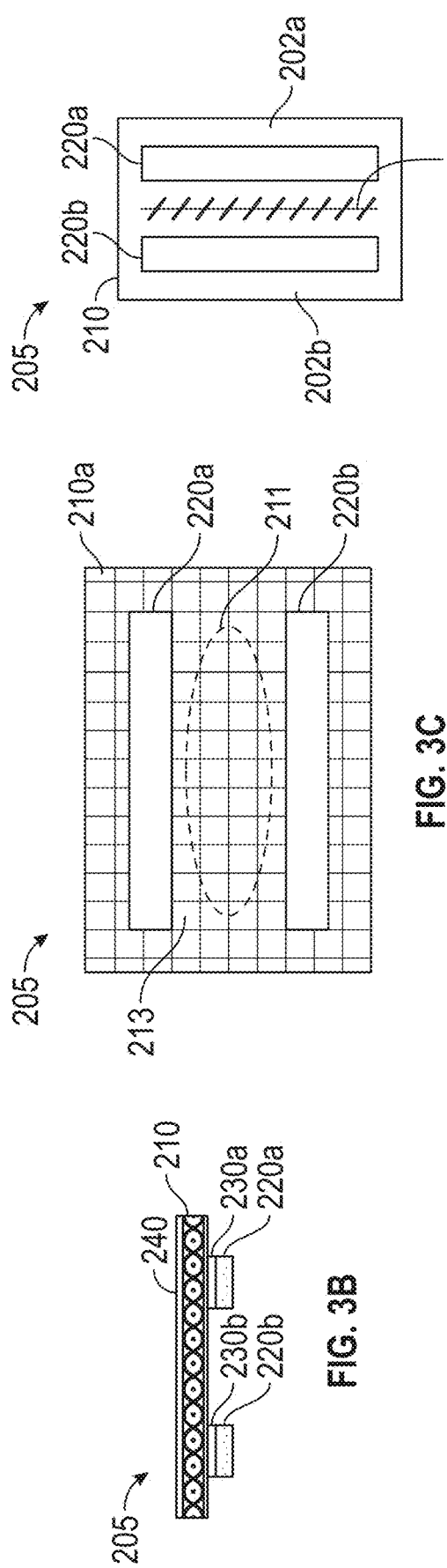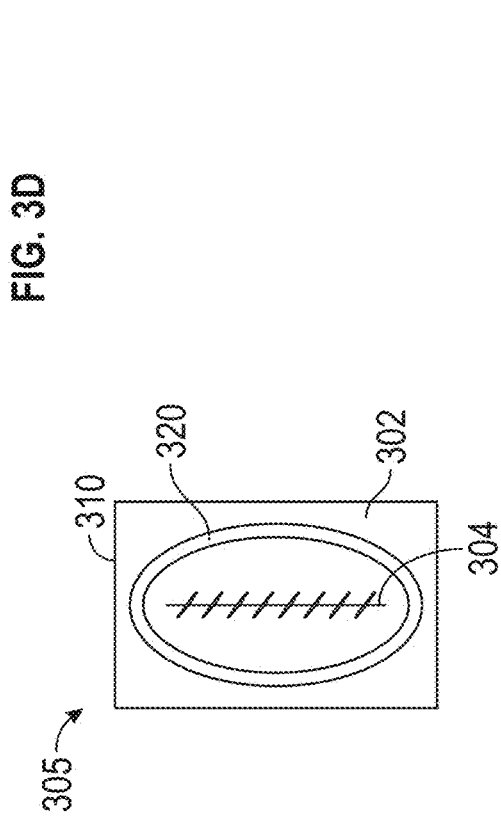

DERMAL PATCH AND SYSTEMS, KITS, AND METHODS ASSOCIATED THEREWITH

BACKGROUND

1. Technical Field

The present disclosure describes a dermal patch for application over a skin wound, and particularly a dermal patch for supporting, protecting, and/or medicating a closed wound in the skin of a patient, such as a closed post-operative incisional wound.

2. Related Art

There are over 300,000,000 surgical procedures performed each year. According to one meta-analysis, about 10% of surgical incisional sites through the skin experience post-surgical wound site infections and about 20% experience wound dehiscence. Either of which can result in prolonged lengths of stay in a facility post-surgery and prolonged duration of pain related to the surgical incision.

More than about 80% of patients in the US are prescribed opioids (oral or injectable) for post-surgical pain and roughly 6% of these patient become addicted to opioids. In 2022, an average of 220 people died on a daily basis as a result of opioid use, which is about 4 times as many people since 2010.

There continues to be a need for improved outcomes for wound treatments, such as surgical incisions, especially related to reduced incidence of wound site infections, wound site openings, and the pain experienced therefrom. Wound pain management and particularly post-operative wound pain management including non-opioid therapies are needed, as well as wound site infection management, and particularly post-operative wound infection management.

SUMMARY

The present disclosure describes a dermal patch and dermal system for supporting, protecting, and/or medicating a wound in the skin of a patient, such as a post-operative incisional wound. Each of the patches and systems described herein are designed to provide structural support to the wound to prevent dehiscence, a physical microbial barrier to prevent infection, and a moisture barrier to prevent water or other liquids from entering the wound, which may disrupt the healing process. Each of the patches and systems described herein are not designed to be implanted but rather easily applied atop the skin. The non-implant dermal patches and systems also cause less impairment to the healing of the wound because the patches and systems do not require a foreign body to be placed in the patient but rather the patch rests atop the skin and/or wound. In addition, since the patches and systems include a predetermined amount of medicament, the chance of delivering the incorrect dose due to user error is greatly reduced. Also, because the dermal patches and systems are applied after the wound is closed, application of such patches and systems may not require a doctor's supervision. Finally, because the medicament depot is not implanted in the wound and the skin layer acts as a diffusion limiting layer to drug penetration into the body, local analgesia can be produced over multiple days with less drug and less systemic drug exposure to the patient.

The present disclosure describes a dermal patch and/or dermal system for treating a wound in a patient's skin. The dermal patch includes at least a support layer and at least one medicament depot. The support layer may be a porous film or porous mesh.

The support layer has a top side and a bottom side opposite the top side. The bottom side of the support layer is configured to face a skin of a patient. The bottom side of the porous support layer may extend between an inner portion and an outer portion. The inner portion of the bottom side is configured to cover the wound and the outer portion of the bottom side is configured to cover the skin surrounding the wound.

The at least one medicament depot is attached to the support layer. Each medicament depot has a top side and a bottom side opposite the top side. The bottom side of the medicament depot is configured to face the skin of the patient.

In some embodiments, the at least one medicament depot is positioned only along the inner portion of the bottom side of the support layer and configured to be placed or lie directly over the wound.

In some embodiments, the at least one medicament depot is positioned only along the outer portion of the bottom side of the support layer and configured to lie adjacent to the wound on a part of a skin surrounding the wound. The at least one medicament depot may be positioned adjacent to the wound without being in contact or covering any part of the wound.

The at least one medicament depot may include a plurality of medicament depots. In some embodiments, a first medicament depot and a second medicament depot positioned on opposite sides of the wound along the skin surrounding the wound.

Each medicament depot includes an effective amount of at least one medicament for treating a wound in the skin of a patient. Each medicament depot is made of an acrylate polymer including at least an acrylate moiety and a polyalkylene glycol moiety.

The acrylate moiety of the acrylate polymer may be derived from or include methacrylate or polymethacrylate. The polyalkylene glycol moiety may be derived from or include polyethylene glycol with repeating units from 1 to 100. The acrylate polymer may be polyethylene glycol methyl ether methacrylate.

In some embodiments, the acrylate polymer is an acrylate copolymer of Formula I or Formula II as follows:

Formula I

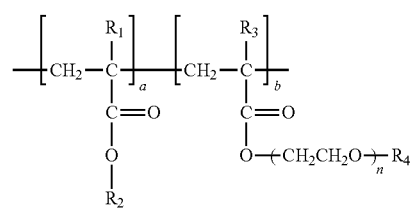

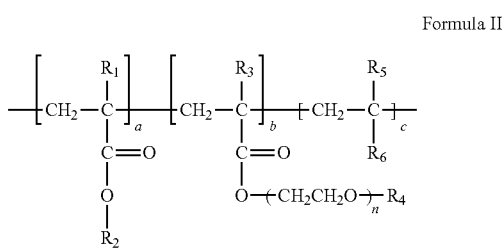

Formula II wherein
a is from 20 to 1000, b is from 20 to 1000, c is from 20 to 1000, and n is from 1 to 200, $R_1$, $R_3$, and $R_5$ are each independently hydrogen or a $C_1$-$C_4$ hydrocarbon; and $R_2$, $R_4$, and $R_6$ are each independently a hydrogen, a $C_1$-$C_{18}$ hydrocarbon or a hetero group containing, F, Cl, Br, I, N, P, Si and O.

In some embodiments, $R_2$ and $R_4$ of Formula I or Formula II are each independently a $C_1$-$C_{18}$ hydrocarbon.

In some embodiments, $R_1$, $R_3$, and/or $R_4$ of Formula I or Formula II are each independently is a hydrogen or methyl group (—$CH_3$), and $R_2$ of Formula I or Formula II is a butyl group (—$C_4H_9$).

In some embodiments, the acrylate polymer of the medicament depot is an acrylate copolymer derived from or including polyethylene glycol methyl ether methacrylate and butyl methacrylate.

Additional materials may be combined with any of the acrylate polymers described herein to form the medicament depot. For example, the medicament depot may be made from a combination of any of the acrylate polymers described herein and an additional composition. The additional composition may include propylene glycol, glycerin, or both.

Any medicament may be used in forming the medicament depots described herein. In some embodiments, the at least one medicament is an anesthetic. The anesthetic may be bupivacaine, and the bupivacaine may be bupivacaine free base or a bupivacaine salt, including bupivacaine HCl.

The medicament depots described herein may be configured to release the medicament contained therein, such as anesthetic (e.g., bupivacaine), for at least 24 hours. In some embodiments, the medicament depots described herein are configured to release the medicament contained therein, such as anesthetic, for at least 3 days.

The medicament depots described herein may be configured to release the medicament contained therein, such as anesthetic, at a release rate of 1 ug/cm$^2$/h to 100 ug/cm$^2$/h.

The medicament depots described herein may be loaded with or include 0.1 mg/cm$^2$ to 20 mg/cm$^2$ of an anesthetic.

The dermal patch may further include a non-porous barrier layer on the top side of each medicament depot. The non-porous barrier layer may be positioned between the top side of the at least one medicament depot and the bottom side of the support layer. Alternatively, the at least one medicament depot may be positioned between the non-porous barrier layer and the top side of the support layer.

The present disclosure also describes a topical dermal system for treating a closed wound. The topical dermal system includes a dermal patch and a separate skin adhesive. The skin adhesive is configured to be applied over the dermal patch to seal the dermal patch over the closed wound.

The present disclosure also describes a method of treating a wound in a skin of a patient. The method includes at least positioning a dermal patch over a closed wound; and applying a separate topical adhesive over the dermal patch, the wound, and skin surrounding the wound to seal the dermal patch over the wound forming a sealed dermal system.

The present disclosure also describes a topical kit for treating a wound in a patient's skin. The kit includes at least a dermal patch and a separate topical adhesive configured to be applied over the dermal patch to seal the dermal patch over the closed wound.

BRIEF DESCRIPTION OF THE DRAWINGS

Embodiments of the presently disclosed dermal patch, dermal system, dermal kit, and methods are described herein with reference to the drawings, wherein:

FIG. 3B is a side view of the dermal patch of FIG. 3A as described in at least one embodiment herein;

FIG. 3C is a bottom view of the dermal patch of FIG. 3A as described in at least one embodiment herein;

FIG. 3D is a top view of the dermal patch of FIG. 3A placed over a wound as described in at least one embodiment herein;

FIG. 4A is a bottom view of still another dermal patch as described in at least one embodiment herein;

FIG. 4B is a top view of the dermal patch of FIG. 4A placed over a wound as described in at least one embodiment herein;

DETAILED DESCRIPTION

Figure 1A:
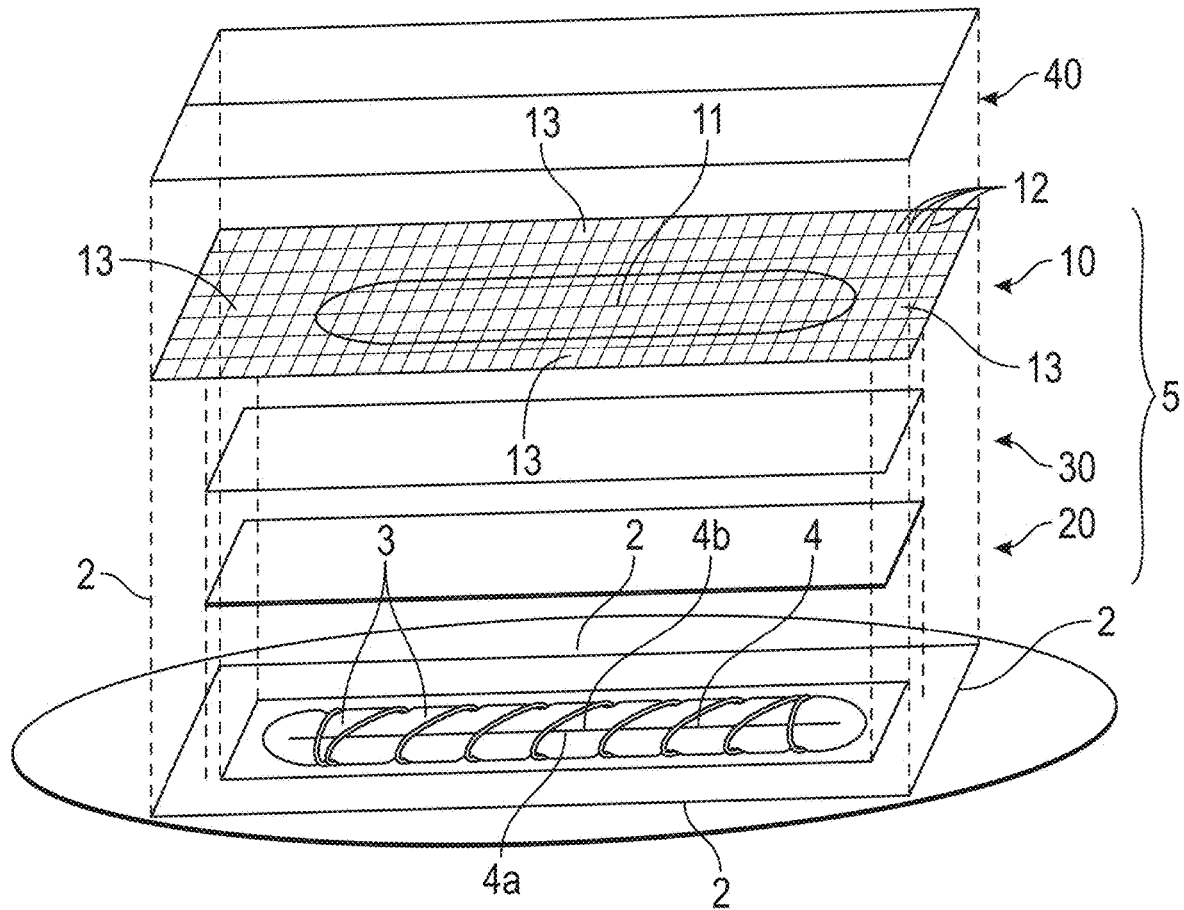
FIG. 1A is an expanded schematic view of a dermal patch as described in at least one embodiment herein.

Embodiments of the presently disclosed dermal patch and dermal systems, methods, and kits associated therewith will now be described in detail with reference to the drawings, in which like reference numerals designate identical or corresponding elements in each of the various views.

The present disclosure provides a medicated dermal patch configured to be applied over a wound on the skin of a patient. The medication depot, including the medicament, can be directly over the wound or near one side or both sides of the wound on skin. The dermal patch may be combined with at least a separate topical adhesive in a dermal system designed to seal the dermal patch over the wound. Surgical kits and methods of using the dermal patch and/or dermal system described herein are also provided.

Throughout the present application, the bottom side of the dermal patch and/or any part of the dermal patch (e.g., support layer, medicament depot, barrier layer, release liner, etc.) is intended to be the skin-facing side and/or the wound-facing side, while the opposing top side of the dermal patch and/or any part of the dermal patch is intended to be the side which faces away from the skin and/or wound.

FIGS. 1A-1D depict a dermal patch 5 including at least a support layer 10 and at least one medicament depot 20. A barrier layer 30 may also be included to cover the medicament depot 20.

Figure 1B:
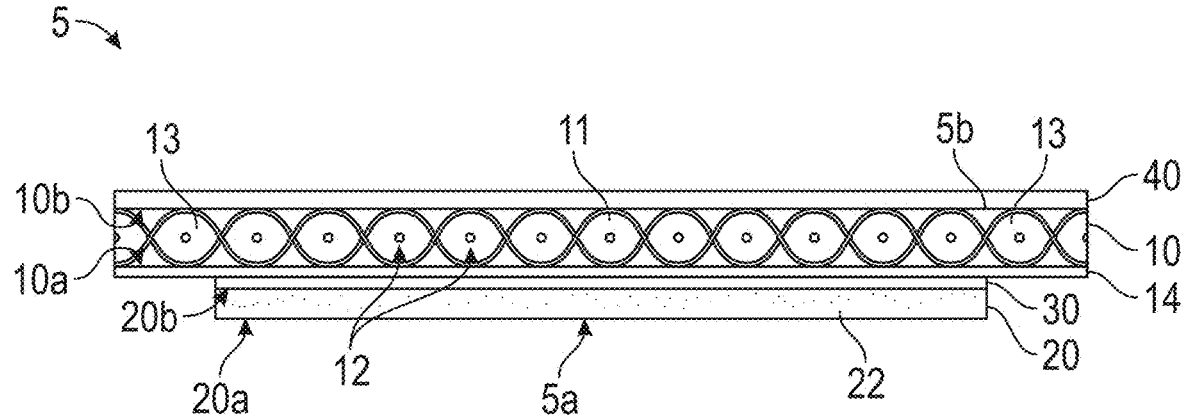
FIG. 1B is a side view of the dermal patch of FIG. 1A as described in at least one embodiment herein.
Figure 1C:
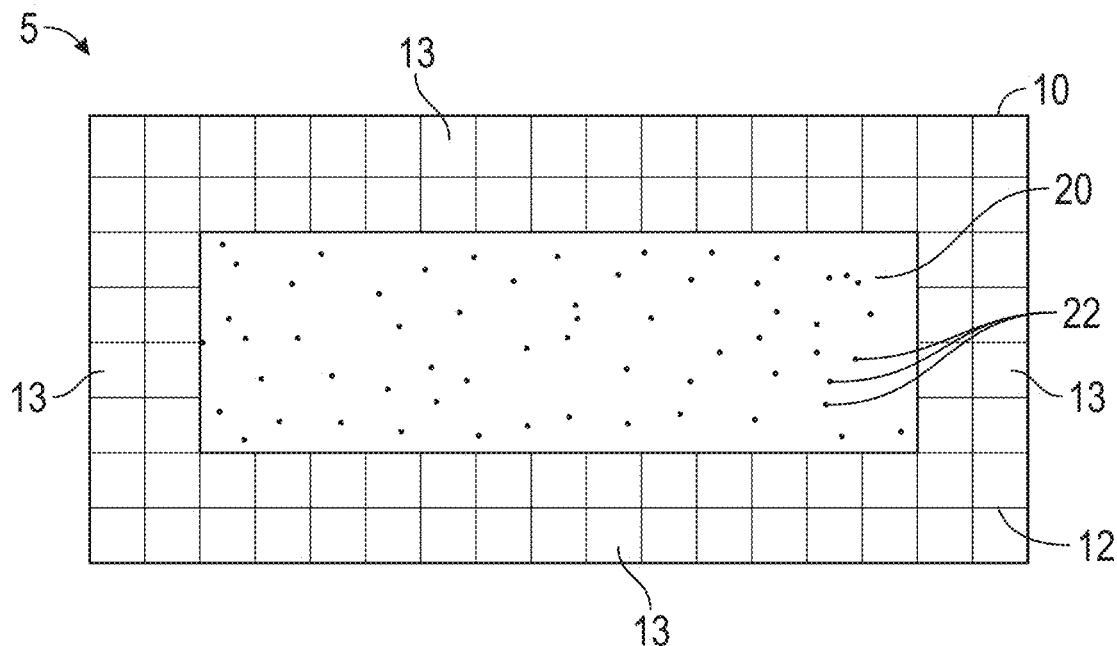
FIG. 1C is a bottom view of the dermal patch of FIG. 1A as described in at least one embodiment herein.
Figure 1D:
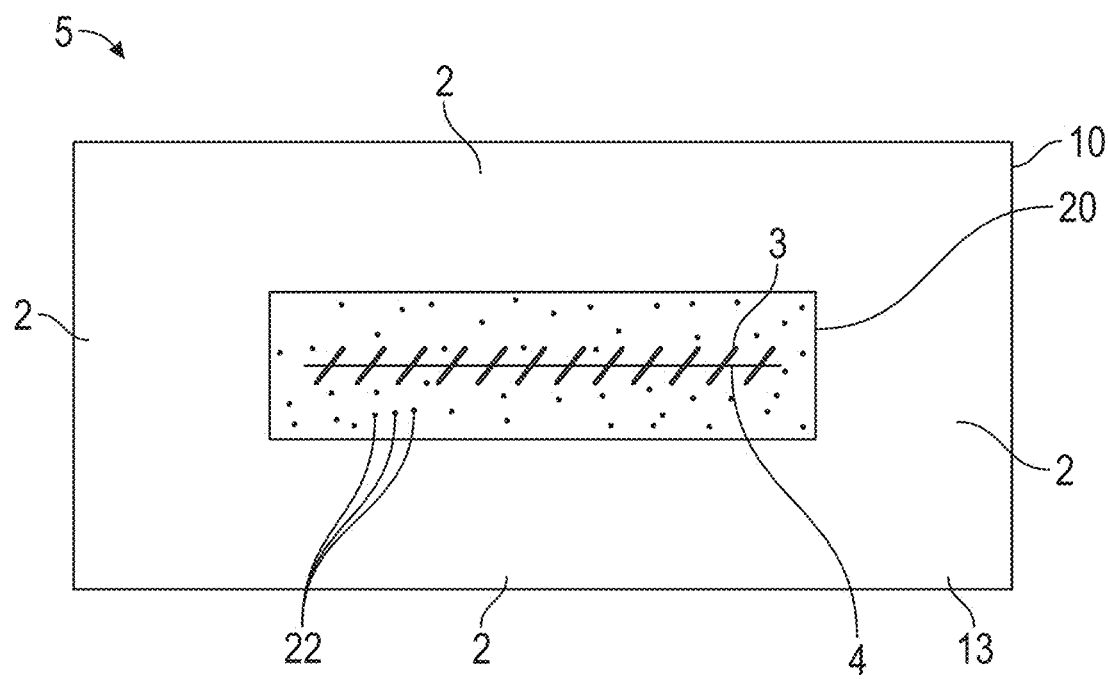
FIG. 1D is a top view of the dermal patch of FIG. 1A positioned over a wound as described in at least one embodiment herein.

As particularly depicted in FIG. 1D, the dermal patch 5 is designed to be applied topically directly over a wound 4 in the skin 2, and particularly a closed wound 4. A closed wound 4 is a wound in the skin where the edges 4a, 4b of the wound are brought together, i.e., approximated, abutted, overlapped, etc., to close the wound 4 prior to application of a dermal patch 5 (and/or dermal system 50). A fastening member 3, such as a suture, staple, tack, pin, screw, or glue, may be included to maintain the wound 4 closed prior to application of the dermal patch 5.

The wound 4 in the skin 2 may be formed by accident or injury, such as a gash or scrape. Alternatively, the wound 4 may be formed intentionally, such as an incisional wound in the skin of a patient from a surgical procedure.

The support layer 10 of the dermal patch 5 may be generally planar and include a bottom side 10a and an opposite top side 10b. The at least one medicament depot 20 of the dermal patch 5 may also be generally planar and include a bottom side 20a and an opposite top side 20b. Each of the bottom and top sides 10a, 10b, respectively, of the support layer 10 extend longitudinally between an inner portion 11 and an outer portion 13 of the support layer 10. The inner portion 11 is designed to be placed over the wound 4 and the outer portion 13 is designed to be placed vertically over the skin 2 surrounding the wound 4.

In some embodiments, as shown in FIGS. 1A-1D, the at least one medicament depot 20 is positioned along the inner portion 11 of the bottom side 10a of the support layer 10 to directly cover the wound 4.

The dermal patch 5 may further include a non-porous barrier layer 30 located on a top side 20b of the at least one medicament depot 20. The barrier layer 30 is designed to prevent the medicament depot 20 from releasing a medicament 22 through the top side 20b of the depot 20. The barrier layer 30 may be made of any non-porous biocompatible polymeric material. In some embodiments, the non-porous barrier layer 30 is made of a non-bioabsorbable polymeric material. In some embodiments, the non-porous barrier layer 30 is made of polyethylene terephthalate (PET).

As shown in FIGS. 1A-1B, in embodiments wherein the medicament depot(s) 20 are positioned beneath the support layer 10, the barrier layer 30 is positioned between the top side 20b of the medicament depot 20 and one of the bottom side 10a or topside 10b of the support layer 10.

The dermal patch 5 may further include at least one removable release liner 40 located on a topside 5b and/or a bottom side 5a of the dermal patch 5. The release liner(s) 40 may be made of any suitable material known in the art.

The support layer 10 is designed to add stiffness to the dermal patch 5 and may be stiffer than the at least one medicament depot 20, as well as any other parts of the dermal patch 5. The support layer may be a porous support layer or a non-porous support layer. In some embodiments, the support layer is a film or tape. In some embodiments, the support layer is a fibrous support layer including one or more fibers (e.g., filaments, yarns, etc.).

In some embodiments, the support layer 10 is a porous support layer generally made up of one or more fibers 12 (e.g., filaments, yarns, etc.) in an overlapping and/or criss-crossing manner. The one or more fibers 12 of the porous support layer 10 may be woven, non-woven, knitted, and/or braided together to form the porous support layer 10. In some embodiments, the porous support layer 10 is a mesh material, such as knitted or woven mesh.

In some embodiments, the porous support layer 10 is composed of a porous film or tape. In some embodiments, the support layer is a porous medical tape, such as any porous surgical tape (e.g., polyester surgical tape from Medtronic). Some non-limiting examples include medical tapes made from at least one of silk, paper, cloth, silicone, latex, rubber, a polymeric material, or combinations thereof. The medical tape may be an adhesive medical tape. In some embodiments, the porous support layer 10 is a non-absorbable perforated porous film. In some embodiments, the porous support layer 10 is a porous tape made from poly vinyl acetate, with or without an adhesive.

The film, tape, or one or more fibers 12 of the porous support layer 10 may be made of and/or derived from any suitable biocompatible material, including but not limited to any bioabsorbable and/or non-bioabsorbable polymeric material. In some embodiments, the film, tape, or one or more fibers 12 of the porous support layer 10 may be made of polypropylene, polyethylene, cellulose, polyethylene terephthalate, polyurethane, poly vinyl acetate, and/or polylactides such as polylactide, polyglycolide, polycaprolactone, polytrimethylene carbonate and the like.

The support layer as described herein may be formed using any method within the purview of those skilled in the art. Some non-limiting examples include weaving, knitting, braiding, crocheting, extruding, spraying, casting, molding, and combinations thereof.

In some embodiments, the support layer may be transparent and/or hypoallergenic. In some embodiments, the porosity of the porous support layer 10 also allows the dermal patch 5 to be generally transparent so the wound is visible after the dermal patch 5 is applied thereto and/or sealed thereon. In addition, the film or one or more fibers 12 of the support layer 10 may be colorless or transparent.

As shown particularly in FIG. 1B, in some embodiments, the support layer 10 (e.g., film, tape, or knit mesh) is an adhesive-backed porous support layer or adhesive-backed mesh. The adhesive-backed support layer 10 includes an adhesive layer 14 on the bottom side 10b of the support layer 10. The adhesive 14 can be used to adhere a barrier layer 30 and/or medicament depot 20 to the support layer 10. The adhesive 14 can be used to adhere the support layer 10 to the skin 2 and/or wound 4.

Figure 2A:
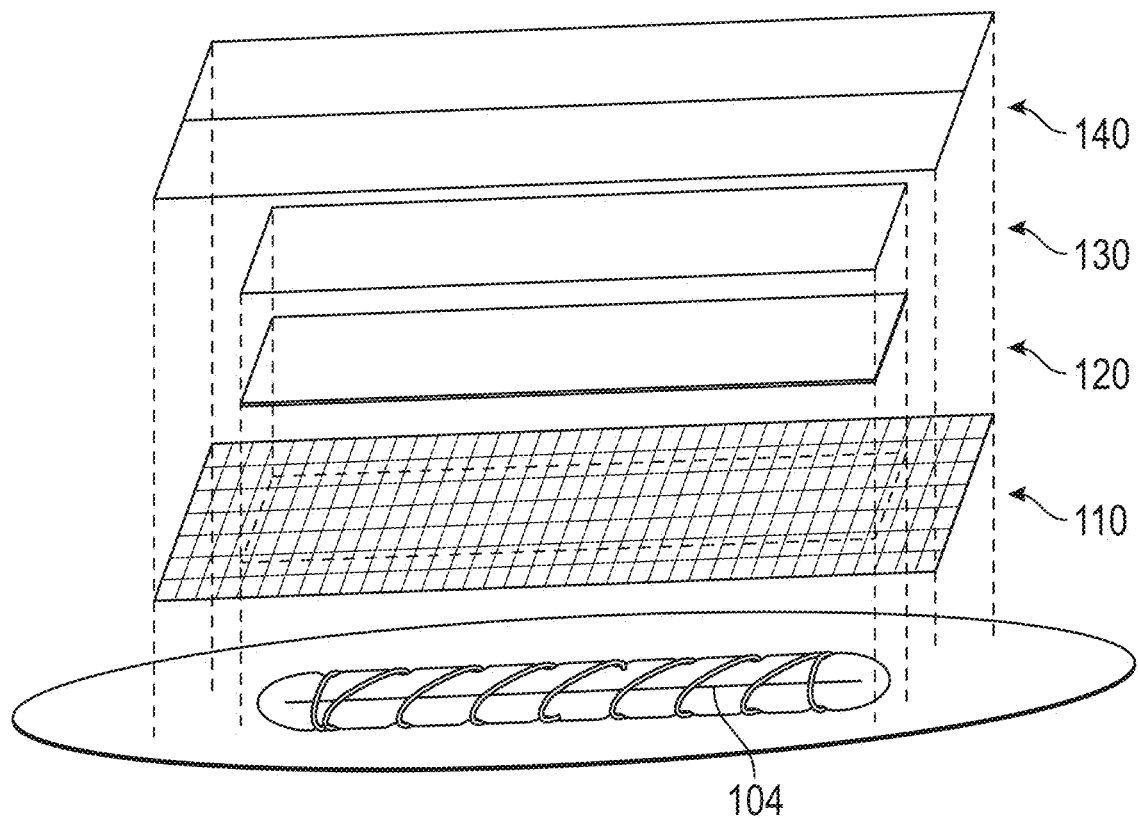
FIG. 2A is an expanded schematic view of another dermal patch as described in at least one embodiment herein.
Figure 2B:
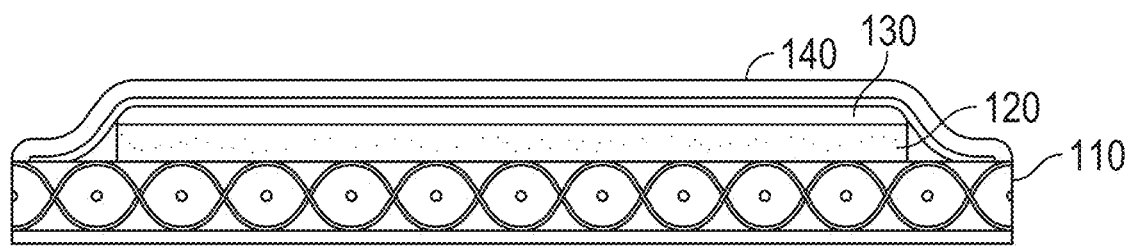
FIG. 2B is a side view of the dermal patch of FIG. 2A as described in at least one embodiment herein.

The adhesive layer 14 may cover any portion of the bottom side of the support layer 10. For example, as depicted in FIGS. 1A-1B, the adhesive layer 14 may completely cover the bottom side 10b of the support layer 10. In another example, as shown in FIGS. 2A-2B, the adhesive layer 14 may be located only along the outer edges of the bottom side 10b of the support layer 10 to avoid adhering to the wound 4.

Any suitable adhesive may be used to form the adhesive layer 14. A non-limiting example includes a pressure sensitive adhesive such as polyacrylics, silicone, polyisobutylene, polyurethanes, polyesters, polysaccharides, polystyrenes, or as copolymers or combinations thereof.

The medicament depot(s) 20 is designed to deliver one or more medicaments 22 to a wound 4 and/or a skin 2 surrounding a wound 4 to treat the wound 4 in some manner, such as by preventing and/or alleviating one or more of infection, pain, or dehiscence associated with the wound 4. The at least one medicament depot 20 may be in the form of a film, foam, and/or hydrogel. In some embodiments, the medicament depot is in a hydrated state which is not adhesive to a wound or skin.

In some embodiments, the at least one medicament depot 20 is a film made or derived from an acrylate polymer (e.g., homopolymer, copolymer, terpolymer, quaterpolymer, etc.). The film may be porous or non-porous. The film may be a hydrogel. The term acrylate is intended to encompass acrylates and various types of acrylates including methacrylates. For example, the at least one medicament depot may be made of or derived from an acrylate monomer or polymer including one or more of ethyl methacrylate, methyl methacrylate, propyl methacrylate, butyl methacrylate, pentyl methacrylate, hexyl methacrylate, etc. In some embodiments, the acrylate polymer is an acrylate copolymer made of or derived from a combination of hexyl methacrylate, vinylpyrrolidone, and vinyl acetate.

In another non-limiting example, the acrylate polymer of the medicament depot may be an acrylate polymer made of or derived from at least a first polymer (or monomer) including an acrylate moiety and a second polymer (or monomer) including a polyalkylene glycol (e.g., polyethylene glycol, polypropylene glycol, polybutylene glycol, etc.) moiety. The acrylate moiety of the first polymer may include methacrylate. The first polyalkylene glycol moiety of the second polymer may include polyethylene glycol (PEG).

In some embodiments, the acrylate polymer of the medicament depot(s) is poly(ethylene glycol) methyl ether methacrylate.

In some embodiments, the acrylate copolymer of the medicament depot(s) is an acrylate polymer including at least a first polymer (or monomer) including an acrylate moiety, a second polymer (or monomer) including a polyalkylene glycol moiety, and a third polymer (or monomer) including a second acrylate moiety. The second acrylate moiety of the third polymer is different from the first acrylate moiety of the first polymer. The second acrylate moiety of the third polymer may be made of or derived from an alkyl acrylate or alkyl methacrylate, such as methyl methacrylate, ethyl methacrylate, propyl methacrylate, butyl methacrylate, etc. In some embodiments, the third polymer of the acrylate polymer of the medicament depot(s) is butyl methacrylate or poly(butyl methacrylate).

In some embodiments, the acrylate terpolymer of the medicament depot(s) includes a first polymer made of or derived from methacrylate or polymethacrylate, a second polymer made of or derived from ethylene glycol or polyethylene glycol, and the third polymer made of or derived from butyl methacrylate or poly(butyl methacrylate).

In some embodiments, the acrylate polymer of the medicament depot(s) is an acrylate copolymer represented by Formula I as follows:

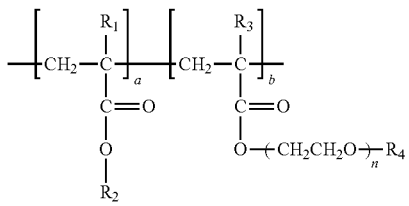

wherein a is from 20 to 1000, b is from 20 to 1000, n is from 1 to 200, $R_1$ and $R_3$ are independently hydrogen or a $C_1$-$C_4$ hydrocarbon;

$R_2$ is a $C_1$-$C_{18}$ hydrocarbon or a hetero group containing, F, Cl, Br, I, S, N, P, Si and O, and $R_4$ is hydrogen, a $C_1$-$C_{18}$ hydrocarbon or a hetero group containing, F, Cl, Br, I, S, N, P, Si and O.

In some embodiments, at least one of $R_1$, $R_3$, or $R_4$ is a methyl group (—$CH_3$) in the acrylate copolymer of Formula I.

In some embodiments, each of $R_1$, $R_3$, and $R_4$ is a methyl group (—$CH_3$) in the acrylate copolymer of Formula I.

In some embodiments, $R_2$ is a butyl group (—$C_4H_9$) in the acrylate copolymer of Formula I.

In some embodiments, each of $R_1$, $R_3$, and $R_4$ is a hydrogen or methyl group (—$CH_3$) and $R_2$ is a butyl group (—$C_4H_9$) in the acrylate copolymer of Formula I.

In some embodiments, n of Formula I is 2-200. In some embodiments, n of Formula I is 2-100. In some embodiments, n of Formula I is 5-75. In some embodiments, n of Formula I is 10-50.

In some embodiments, a and b of Formula I are independently 25-750. In some embodiments, a and b of Formula I are independently 35-500. In some embodiments, a and b of Formula I are independently 45-400.

In some embodiments, $R_2$ is a substituted or unsubstituted heterocyclic compound containing N in the acrylate copolymer of Formula I. Some non-limiting examples of suitable heterocyclic compounds containing N include aziridines, piperidines, pyridines, piperazines, pyrrolidones, caprolactam, succinimide and the like.

In some embodiments, $R_2$ is a substituted or unsubstituted heterocyclic compound containing S in the acrylate copolymer of Formula I. Some non-limiting examples of suitable heterocyclic compounds containing S include thiiranes, thietanes, tetrahydrothiophenes, thiophenes, thiazoles, sulfolanes, thiocanes, thianes, and thiol ester and the like.

In some embodiments, $R_2$ is a substituted or unsubstituted heterocyclic compound containing O in the acrylate copolymer of Formula I. Some non-limiting examples of suitable heterocyclic compounds containing O include oxiranes, oxetanes, furans, tetrahydrofurans, oxazoles, morpholines, uracils, benzofurans, and the like.

In some embodiments, $R_2$ is a substituted or unsubstituted heterocyclic compound containing fluorine in the acrylate copolymer of Formula I. Some non-limiting examples of suitable heterocyclic compounds containing fluorine include fluorine substituted alkyl groups.

In some embodiments, $R_2$ is a substituted or unsubstituted silicon-containing compound in the acrylate copolymer of Formula I. Some non-limiting examples of suitable silicon-containing compounds include polysilicone.

In some embodiments, $R_2$ is a substituted or unsubstituted phosphorous-containing heterocyclic compound in the acrylate copolymer of Formula I. Some non-limiting examples of suitable phosphorous-containing compounds include phosphoryl choline.

In some embodiments, the acrylate polymer of the medicament depot(s) is an acrylate copolymer or terpolymer represented by Formula II as follows:

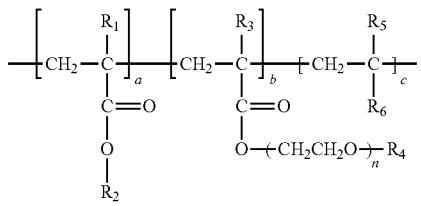

wherein
a is from 20 to 1000,
b is from 20 to 1000,
c is from 20 to 1000,
n is from 1 to 200,
$R_1$, $R_3$, and $R_5$ are independently hydrogen or a $C_1$-$C_4$ hydrocarbon;
$R_2$, $R_4$, and $R_6$ are independently a hydrogen, a $C_1$-$C_{18}$ hydrocarbon or a hetero group containing, F, Cl, Br, I, N, P, Si and O.

In some embodiments, at least one of $R_1$, $R_3$, or $R_4$ is a methyl group (—$CH_3$) in the acrylate copolymer of Formula II. In some embodiments, each of $R_1$, $R_3$, and $R_4$ is a methyl group (—$CH_3$) in the acrylate copolymer of Formula II.

In some embodiments, $R_2$ is a butyl group (—$C_4H_9$) in the acrylate copolymer of Formula II.

In some embodiments, each of $R_1$, $R_3$, and $R_4$ is a hydrogen or methyl group (—$CH_3$) and $R_2$ is a butyl group (—$C_4H_9$) in the acrylate copolymer of Formula II.

In some embodiments, n of Formula II is 2-200. In some embodiments, n of Formula II is 2-100. In some embodiments, n of Formula I is 5-75. In some embodiments, n of Formula II is 10-50.

In some embodiments, a, b, and c of Formula II are independently 25-750. In some embodiments, a, b, and c of Formula II are independently 35-500. In some embodiments, a, b, and c of Formula II are independently 45-400.

In some embodiments, $R_2$ is a substituted or unsubstituted heterocyclic compound containing N in the acrylate copolymer of Formula II. Some non-limiting examples of suitable heterocyclic compounds containing N include aziridines, piperidines, pyridines, piperazines, pyrrolidones, caprolactam, succinimide and the like.

In some embodiments, $R_2$ is a substituted or unsubstituted heterocyclic compound containing S in the acrylate copolymer of Formula II. Some non-limiting examples of suitable heterocyclic compounds containing S include thiiranes, thietanes, tetrahydrothiophenes, thiophenes, thiazoles, sulfolanes, thiocanes, thianes, and the like.

In some embodiments, $R_2$ is a substituted or unsubstituted heterocyclic compound containing O in the acrylate copolymer of Formula II. Some non-limiting examples of suitable heterocyclic compounds containing O include oxiranes, oxetanes, furans, tetrahydrofurans, oxazoles, morpholines, uracils, benzofurans, and the like.

In some embodiments, $R_2$ is a substituted or unsubstituted fluorine-containing heterocyclic compound in the acrylate copolymer of Formula II. Some non-limiting examples of suitable heterocyclic compounds containing fluorine include fluorine substituted alkyl groups.

In some embodiments, $R_2$ is a substituted or unsubstituted silicon-containing heterocyclic compound in the acrylate copolymer of Formula II. Some non-limiting examples of suitable silicon-containing heterocyclic compounds include polysilicone.

In some embodiments, $R_2$ is a substituted or unsubstituted phosphorous-containing heterocyclic compound in the acrylate copolymer of Formula II. Some non-limiting examples of suitable phosphorous-containing heterocyclic compounds include phosphoryl choline.

The acrylate polymers (e.g., homopolymer, copolymer, terpolymer, quaterpolymer, etc.) described herein may be used alone to form the medicament depot(s) or may be blended with an additional material to form the medicament depot(s). For example, the acrylate polymers described herein (e.g., Formula I or Formula II) may be further blended with an additional composition or mixture including at least one additional material, including but not limited to an additional polymer, a plasticizer, an alkylene glycol, or any combination thereof. By blended, the main constituents of the acrylate polymer generally do not crosslink or form covalent bonds with the additional materials.

In one example, the additional polymer of the additional composition may include a second polyalkylene glycol moiety such as polypropylene glycol. In particularly useful embodiments, the second alkylene glycol of the additional composition may be different from the first polyalkylene glycol moiety of the acrylate copolymer. For example, an acrylate copolymer including a second polymer having a polyethylene glycol moiety may be blended with an additional composition including a polypropylene glycol.

In another example, the acrylate polymers described herein may be combined with an additional composition including an alkylene glycol (e.g., ethylene glycol, propylene glycol), a plasticizer, or both. In some embodiments, an acrylate polymer including a polyethylene glycol moiety is blended with an additional composition including propylene glycol and glycerin.

In some embodiments, the at least one medicament depot is made or derived from any of the acrylate polymers described herein blended with an additional composition including propylene glycol and/or glycerin to facilitate the drug permeation through the skin or increase the drug solubility or stability in the formulation. Additional excipients may be included with the additional composition. Some non-limiting examples of suitable excipients include urea, urea compounds or amide compounds, or phenolic compounds such as BHT for drug stability, as well as dyes, preservatives, and the like.

In some embodiments, the propylene glycol is a predominant amount of the additional composition. In some embodiments, the glycerin is the predominant amount of the additional composition. The base acrylate polymer being the predominant amount of the base of the medicament depot. The various additional compositions may include the additional materials in a solution in combination with a volatile solvent such as methanol, ethanol, isopropanol, etc. or by mixing the materials in the polymer melt.

The at least one medicament depots described herein may alternatively be made of a material other than an acrylate polymer, such as a material made of or derived from a combination of two complimentary precursors. For example, a first precursor including pendant electrophilic functional groups may be reacted and/or crosslinked with a second precursor including pendant nucleophilic functional groups such that the complimentary electrophilic and nucleophilic groups react to form a covalent bond between the first and second precursors to form the medicament depot. Suitable non-limiting examples of electrophilic functional groups include N-hydroxysuccinimides (NHS), sulfosuccinimides, carbonyldiimidazole, sulfonyl chloride, aryl halides, sulfosuccinimidyl esters, N-hydroxysuccinimidyl esters, succinimidyl esters such as succinimidyl succinates (SS), succinimidyl glutarates (SG), and/or succinimidyl propionates, isocyanates, thiocyanates, carbodiimides, benzotriazole carbonates, epoxides, aldehydes, maleimides, imidoesters, combinations thereof, and the like. Suitable non-limiting examples of complimentary nucleophilic groups include —$NH_2$, —SH, —OH, —$PH_2$, and —CO—NH—$NH_2$.

In some embodiments, the medicament depot(s) may be formed from two-part complimentary precursor materials particularly including a first precursor functionalized with pendant amine groups (such as polyamines like trilysine, genipin, PEG-diamines, etc.) and a second precursor functionalized with pendant succinimidyl groups (NHS, SG, SS, etc.).

In some embodiments, the medicament depot(s) may be formed from two-part complimentary precursor materials particularly including a first PEG precursor functionalized with pendant amine groups and a second PEG precursor functionalized with pendant succinimidyl groups (NHS, SG, SS, etc.). For example, a PEG-diamine may be combined with PEG-SG to form one or more medicament depots.

Methods for creating the depots may include but are not limited to spraying, film casting, molding, lyophilizing, and the like. One or more of these may be used in forming the medicament depots.

The various medicament depots described herein are designed to deliver one or more medicaments to a wound and/or skin immediately surrounding a wound. Some non-limiting examples of suitable medicaments include but are not limited to anti-adhesives, antimicrobials, analgesics, antipyretics, anesthetics, antipruritics, antihistamines, anti-inflammatories, hormones, growth factors, cytokines, chemotherapeutics, immunotherapies, targeted therapies, muscle relaxants, sedatives, steroids, anti-scarring agents, neuro, cardiac and blood related, hormonal, nicotine, etc. The medicament may be used in any form including but not limited to various salts forms, free base forms, free acid form, pro-drugs, and/or hydrates.

The medicament depot(s) is designed to deliver a therapeutically effective amount of at least one medicament to a wound and/or the healthy skin surrounding the wound. By "therapeutically effective amount" is meant an amount of a given medicament(s) sufficient to prevent, i.e. prophylactically, or treat, i.e. reduce or eliminate, one or more symptoms of a disease or condition in the patient.

In some embodiments, the medicament depots described herein are designed to deliver a therapeutically effective amount of a medicament to reduce and/or alleviate pain associated with the wound. Some non-limiting examples of suitable medicaments includes analgesics, anesthetics, anti-inflammatories, muscle relaxants, sedatives, steroids, and combinations thereof.

In some embodiments, the medicament is a non-opioid medicament, such as a non-opioid pain preventer or reliever. For example, the medicament may be an anesthetics agent. Some non-limiting examples of suitable anesthetics include, but are not limited to, ambucaine, amolanone, amylocalne hydrochloride, benoxinate, benzocaine, betoxycaine, biphenamine, bupivacaine, butacaine, butaben, butanilicaine, butethamine, butoxycaine, carticaine, chloroprocaine hydrochloride, cocaethylene, cocaine, cyclomethycaine, dibucaine hydrochloride, dimethisoquin, dimethocaine, diperadon hydrochloride, dyclonine, ecgonidine, ecgonine, ethyl chloride, beta-eucaine, euprocin, fenalcomine, fomocaine, hexylcaine hydrochloride, hydroxytetracaine, isobutyl p-aminobenzoate, leucinocaine mesylate, levobupivacaine, levoxadrol, lidocaine, mepivacaine, meprylcaine, metabutoxycaine, methyl chloride, myrtecaine, naepaine, octacaine, orthocaine, oxethazaine, parethoxycaine, phenacaine hydrochloride, phenol, piperocaine, piridocaine, polidocanol, pramoxine, prilocalne, procaine, propanocaine, proparacaine, propipocaine, propoxycaine hydrochloride, pseudococaine, pyrrocaine, ropivacaine, salicyl alcohol, tetracaine hydrochloride, tolycaine, trimecaine, zolamine, and combinations thereof. In some embodiments, the anesthetic may include benzocaine, lidocaine, bupivacaine, and/or combinations thereof. In particular embodiments, the medicament is an anesthetic such as bupivacaine salt including bupivacaine HCl or bupivacaine free base.

The base polymer or acrylate polymer of the medicament depot represents a majority, i.e., greater than 50% by weight of medicament depot, while the one or medicaments represent a minority, i.e., less than 50% by weight of the medicament depots described herein. In some embodiments, the base polymer represents about 51-99% by weight of the medicament depot, the one or medicaments represent about 1-49% by weight, and optionally any additional compositions blended with the base polymer may represent about 0-35% by weight of the medicament depot. In some embodiments, the base polymer represents about 51-70% by weight of the medicament depot, the one or medicaments represent about 1-10% by weight, and any additional compositions blended with the base polymer as described herein may represent about 20-40% by weight of the medicament depot.

Each of the medicament depots described herein may include 0.01 mg/cm$^2$ to 100 mg/cm$^2$ of a medicament. In some embodiments, each medicament depot includes 0.1 mg/cm$^2$ to 20 mg/cm$^2$ of a medicament. In some embodiments, each medicament depot includes 1 mg/cm$^2$ to 10 mg/cm$^2$ of a medicament. In some embodiments, each medicament depot includes 2.5 mg/cm$^2$ to 7.5 mg/cm$^2$ of a medicament.

In some embodiments, each of the medicament depots described herein include 0.01 mg/cm$^2$ to 100 mg/cm$^2$ of a non-opioid pain preventer or reliever. In some embodiments, each medicament depot includes 0.1 mg/cm$^2$ to 20 mg/cm$^2$ of a non-opioid pain preventer or reliever. In some embodiments, each medicament depot includes 1 mg/cm$^2$ to 10 mg/cm$^2$ of a non-opioid pain preventer or reliever. In some embodiments, each medicament depot includes 2.5 mg/cm$^2$ to 7.5 mg/cm$^2$ of a non-opioid pain preventer or reliever.

In some embodiments, each of the medicament depots described herein include 0.01 mg/cm$^2$ to 100 mg/cm$^2$ of an anesthetic (e.g., bupivacaine, lidocaine, etc.). In some embodiments, each medicament depot includes 0.1 mg/cm$^2$ to 20 mg/cm$^2$ of an anesthetic (e.g., bupivacaine, lidocaine, etc.). In some embodiments, each medicament depot includes 1 mg/cm$^2$ to 10 mg/cm$^2$ of an anesthetic (e.g., bupivacaine, lidocaine, etc.). In some embodiments, each medicament depot includes 2.5 mg/cm$^2$ to 7.5 mg/cm$^2$ of an anesthetic (e.g., bupivacaine, lidocaine, etc.).

In some embodiments, the dermal patches described herein may include a plurality of medicament depots, each depot including the same medicament at the same amount (mg/cm$^2$).

In some embodiments, the dermal patches described herein may include a plurality of medicament depots, each depot including a different medicament at the same amount (mg/cm$^2$).

In some embodiments, the dermal patches described herein may include a plurality of medicament depots, each depot including the same medicament at different amounts (mg/cm$^2$).

In some embodiments, the dermal patches described herein may include a plurality of medicament depots, each depot including a different medicament at different amounts (mg/cm$^2$).

Each of the medicament depots described herein may be configured to release a medicament at a rate of 0.01 µg/cm$^2$/h to 10 mg/cm$^2$/h. In some embodiments, each medicament depot is configured to release a medicament at a rate of 0.1 µg/cm$^2$/h to 1 mg/cm$^2$/h. In some embodiments, each medicament depot is configured to release a medicament at a rate of 1 µg/cm$^2$/h to 100 µg/cm$^2$/h. In some embodiments, each medicament depot is configured to release a medicament at a rate of 2.5 µg/cm$^2$/h to 50 µg/cm$^2$/h. In some embodiments, each medicament depot is configured to release a medicament at a rate of 5 µg/cm$^2$/h to 25 µg/cm$^2$/h.

In some embodiments, each of the medicament depots described herein is configured to release a non-opioid pain preventer or reliever at a rate of 0.01 µg/cm$^2$/h to 10 mg/cm$^2$/h. In some embodiments, each medicament depot is configured to release a non-opioid pain preventer or reliever at a rate of 0.1 µg/cm$^2$/h to 1 mg/cm$^2$/h. In some embodiments, each medicament depot is configured to release a non-opioid pain preventer or reliever at a rate of 1 µg/cm$^2$/h to 100 µg/cm$^2$/h. In some embodiments, each medicament depot is configured to release a non-opioid pain preventer or reliever at a rate of 2.5 µg/cm$^2$/h to 50 µg/cm$^2$/h. In some embodiments, each medicament depot is configured to release a non-opioid pain preventer or reliever at a rate of 5 µg/cm$^2$/h to 25 µg/cm$^2$/h.

In some embodiments, each of the medicament depots described herein is configured to release an anesthetic (e.g., bupivacaine, lidocaine, etc.) at a rate of 0.01 µg/cm$^2$/h to 10 mg/cm$^2$/h. In some embodiments, each medicament depot is configured to release an anesthetic (e.g., bupivacaine, lidocaine, etc.) at a rate of 0.1 µg/cm$^2$/h to 1 mg/cm$^2$/h. In some embodiments, each medicament depot is configured to release an anesthetic (e.g., bupivacaine, lidocaine, etc.) at a rate of 1 µg/cm$^2$/h to 100 µg/cm$^2$/h. In some embodiments, each medicament depot is configured to release an anesthetic (e.g., bupivacaine, lidocaine, etc.) at a rate of 2.5 µg/cm$^2$/h to 50 µg/cm$^2$/h. In some embodiments, each medicament depot is configured to release an anesthetic (e.g., bupivacaine, lidocaine, etc.) at a rate of 5 µg/cm$^2$/h to 25 µg/cm$^2$/h.

In some embodiments, the dermal patches described herein may include a plurality of medicament depots, each depot configured to release the same medicament at the same rate.

In some embodiments, the dermal patches described herein may include a plurality of medicament depots, each depot configured to release a different medicament at the same rate.

In some embodiments, the dermal patches described herein may include a plurality of medicament depots, each depot configured to release the same medicament at different rates.

In some embodiments, the dermal patches described herein may include a plurality of medicament depots, each depot configured to release a different medicament at different rates.

In some embodiments, the medicament depots described herein are configured to deliver one or more medicaments for at least 3 days. In some embodiments, the medicament depots described herein are configured to deliver one or more non-opioid pain preventers or relievers for at least 3 days. In some embodiments, the medicament depots described herein are configured to deliver one or more anesthetics (e.g., bupivacaine, lidocaine, etc.) for at least 3 days.

In some embodiments, the medicament depots described herein are configured to deliver one or more medicaments for at least 7 days. In some embodiments, the medicament depots described herein are configured to deliver one or more non-opioid pain preventers or relievers for at least 7 days. In some embodiments, the medicament depots described herein are configured to deliver one or more anesthetics (e.g., bupivacaine, lidocaine, etc.) for at least 7 days.

In some embodiments, the at least one medicament depot may be in the form of single layer. In some embodiments, the at least one medicament may be in the form of multiple layers. For example, the at least one medicament depot may include at least a first layer containing a first medicament, such as bupivacaine salt including bupivacaine HCl, and a second layer containing a second medicament, such as bupivacaine in a free base state. It is envisioned that the first layer and/or medicament will provide an immediate release into local tissue as a burst effect to initiate treatment shortly (i.e., seconds to minutes) after application of the dermal patch to the skin. It is further envisioned that the second layer and/or medicament will release more slowly providing treatment for up to 7 days after application of the dermal patch.

Turning now to FIGS. 2A-2B, another example of a suitable dermal patch 105 is depicted. The dermal patch 105 of FIGS. 2A-2B is generally similar to the dermal patch 5 of FIGS. 1A-1D, however the medicament depot 120 and barrier layer 130 are positioned on a top side 110b of the porous support layer 110. One or more release liners 140 may also be applied to the dermal patch 105.

In the configuration of FIGS. 2A-2B, the medicament depot 120 can still be located over the wound 104 but is vertically spaced from the wound 104 via the support layer 110. Although the medicament depot 120 may be designed not to attach to the wound in either dermal patch 5 or dermal patch 105, it is envisioned that by physically spacing the medicament depot 120 from the wound 104 by the support layer 110, the likelihood of attachment of the medicament depot 120 to the wound 104 is further decreased.

In addition, in some embodiments, the medicament depot 120 of dermal patch 105 may be removable and/or replaceable (as opposed to the more permanently attached medicament depot 20 of patch 5). It is envisioned that the medicament depot 120 can be configured to be replaced as needed with a new second medicament depot.

Figure 3A:
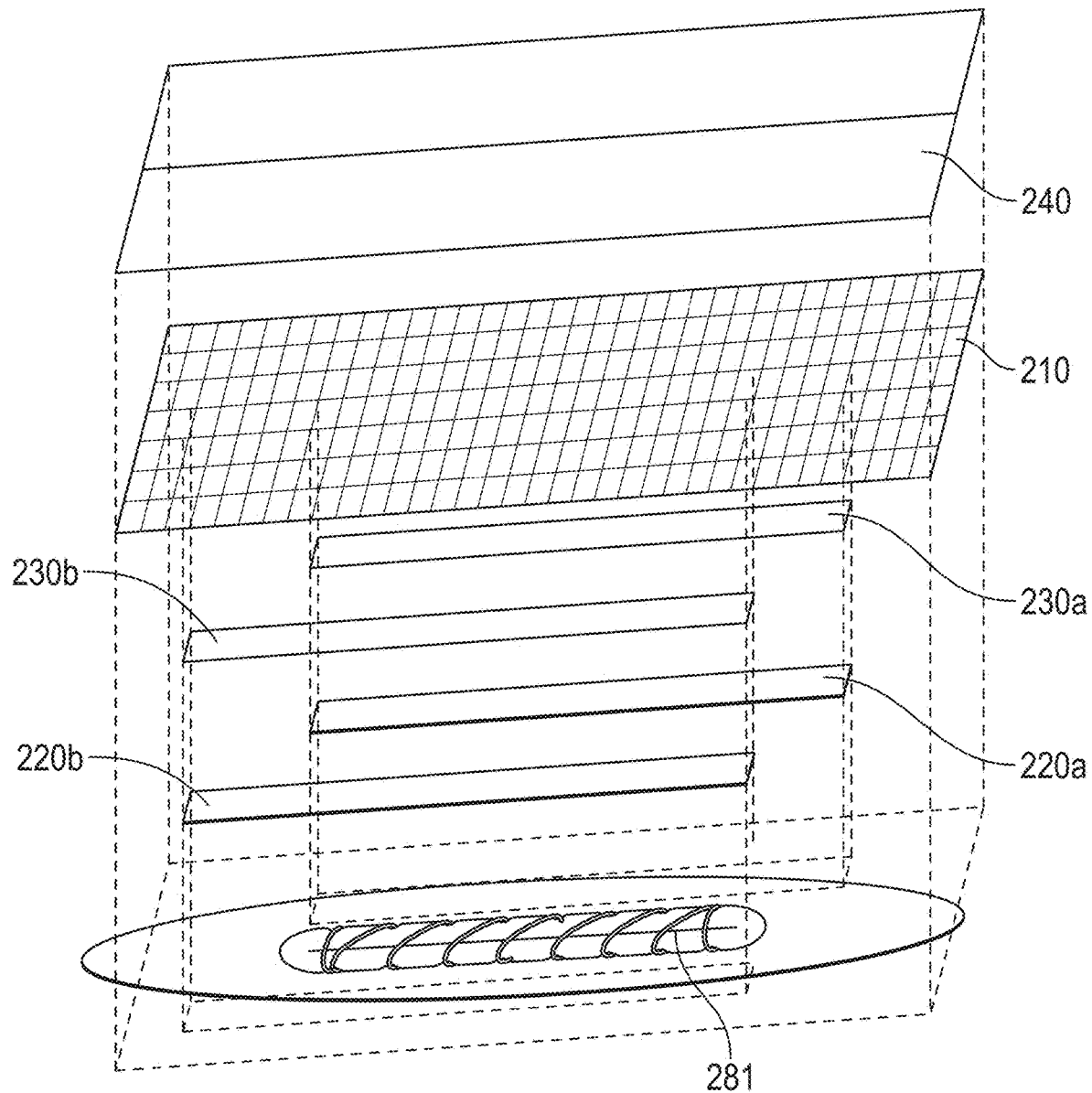
FIG. 3A is an expanded schematic view of still another dermal patch as described in at least one embodiment herein.

FIGS. 3A-3D depict yet another example of a suitable dermal patch 205. The dermal patch 205 however includes a plurality of medicament depots 220a, 220b spaced along the outer portion 213 of the bottom side 210a of the porous support layer 210. The inner portion 211 of the bottom side 210a is free of any medicament depots. As best seen in FIG. 3D, the spaced depots 220a, 220b are configured such that the first medicament depot 220a is applied on a first part 202a of the surrounding skin 202 and the second medicament depot 220b may be applied on a second part 202b of the surrounding skin 202. The first part 202a and the second part 202b of the surrounding skin 202 may be on opposite sides of the wound 204. The first and second medicament depots 220a, 220b may straddle opposite sides of the wounds 204.

Dermal patch 205 is designed to deliver the medicament indirectly to the wound via the immediately surrounding skin 202. It is envisioned that by not covering the wound with the one or more medicament depots 220a, 220b, the medicament depots 220a, 220b (and/or the barrier layers 230a, 230b) do not need to be transparent to provide visibility to the wound 204 after placement of the patch 205. However, in some embodiments, the first and second medicament depots 220a, 220b (and/or the barrier layers 230a, 230b) are transparent. One or more release liners 240 may also be applied to the dermal patch 205.

Each of the plurality of medicament depots 220a, 220b may be made from any of the various base polymers described herein. In some embodiments, the plurality of medicament depots 220a, 220b are made from the same base polymer. In some embodiments, the plurality of medicament depots 220a, 220b are made from different base polymer materials.

Each of the plurality of medicament depots 220a, 220b may include any of the various medicaments described herein. In some embodiments, the plurality of medicament depots 220a, 220b include the same medicament. In some embodiments, the plurality of medicament depots 220a, 220b include different medicaments.

In some embodiments, the dermal patch 205 includes a porous support layer (e.g., knit mesh or perforated film) 210 including a pair of medicament depots 220a, 220b derived from any of the acrylate polymers or copolymers described herein (e.g., Formula I, Formula II, etc.) and including a non-opioid medicament suitable for relieving pain associated with the wound, such as a local anesthetic like bupivacaine.

FIGS. 4A-4B depict yet another dermal patch 305 including one medicament depot 320 designed to completely wrap around the wound 304 on the surrounding skin 302. In instances where the medicament is suitable for preventing infection, such as an antimicrobial or antibiotic medicament, it is envisioned that the complete wrapping of the wound may create a ring of protection around the wound while leaving the wound visible during the healing process.

Figure 5B:
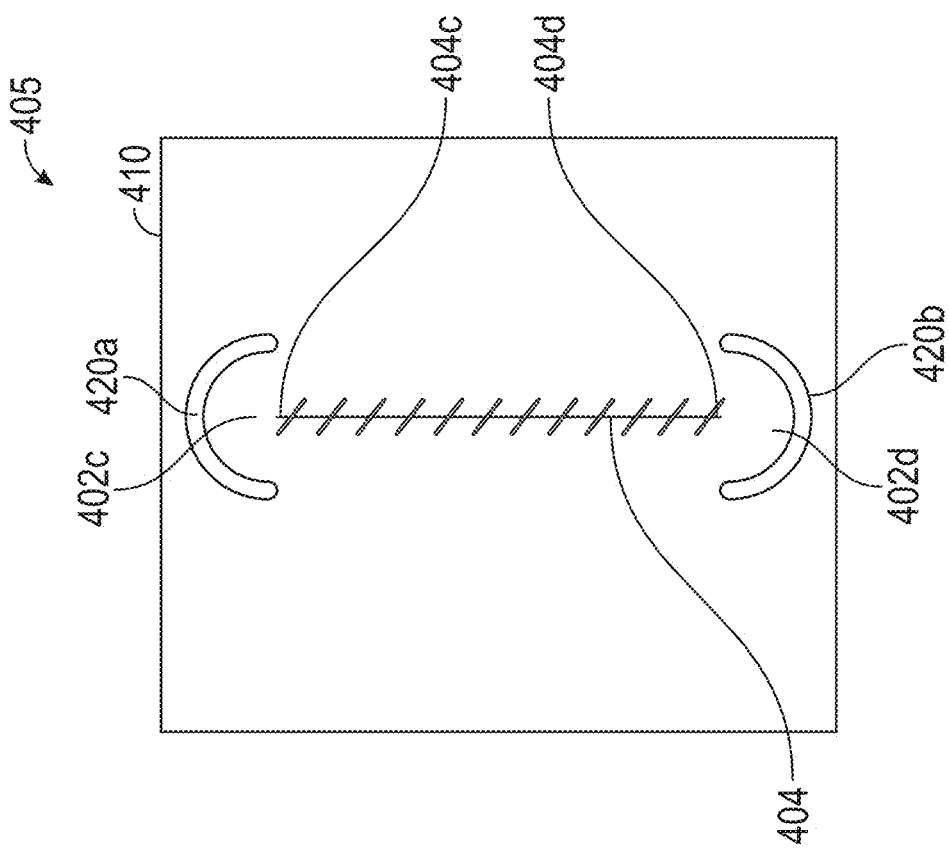
FIG. 5B is a top view of the dermal patch of FIG. 5A placed over a wound as described in at least one embodiment herein.
Figure 5A:
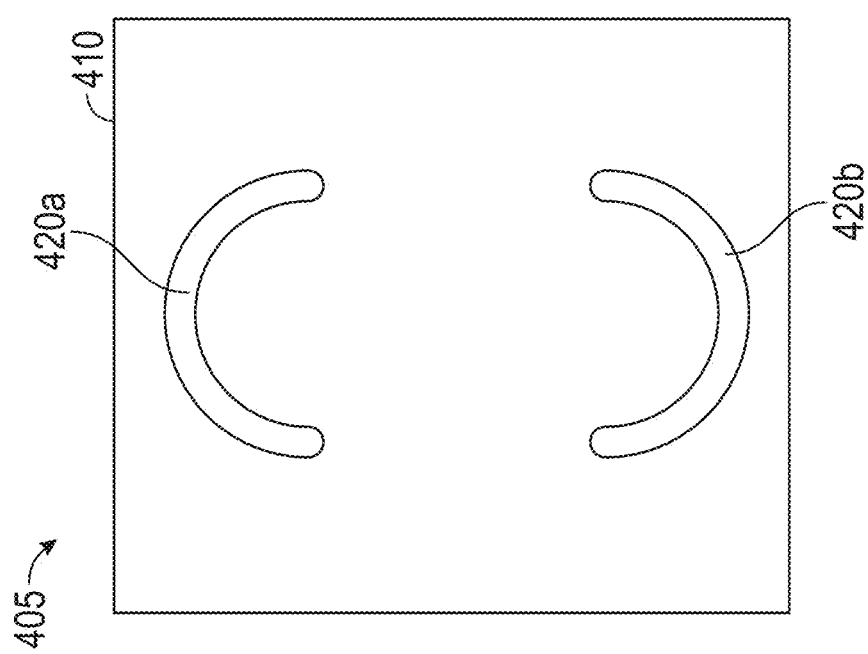
FIG. 5A is a bottom view of yet another dermal patch as described in at least one embodiment herein.

FIGS. 5A-5B depict yet another dermal patch 405 including a pair of opposing medicament depots 420a, 420b spaced laterally from the ends 404c, 404d of the wound 404 on the surrounding healthy skin 402c, 402d. Both dermal patches 305 and 405 are similar to dermal patch 205 in that the medicament depots 420a, 420b do not interact directly with the wound 404. Medicament depots 420a, 420b (as well as parts of medicament depots 320a, 320b) positioned near the ends 404c, 404d of the wound 404 may be particularly beneficial in blocking pain associated with the wound 404 because the medicament is delivered to the portion of the wound including the larger nerve bundles, particularly for surgical incisional wounds associated with C-section and/or Pfannenstiel incisions. The offset placement of the medicament depots 420a, 420b, relative to the wound 404 provides the added benefit of delivering the medicament to the location most in need of the medicament while simultaneously providing visibility to the wound incision to ensure closure is maintained and/or infection is prevented during the healing process.

Although the medicament depots are depicted as generally circular or semi-circular, it is envisioned that the shape of the depots is not intended to be limited to as shown. Any suitable shape of the medicament depots is envisioned.

Each of the various dermal patches depicted and described may be combined with a separate topical adhesive to form a dermal system suitable for closing a wound. FIGS. 5A-5C illustrate one dermal system including the dermal patch 205 of FIG. 3A. However, any of the dermal patches 105, 305, 405 described and/or depicted herein may be used to form the dermal system.

Figure 6A:
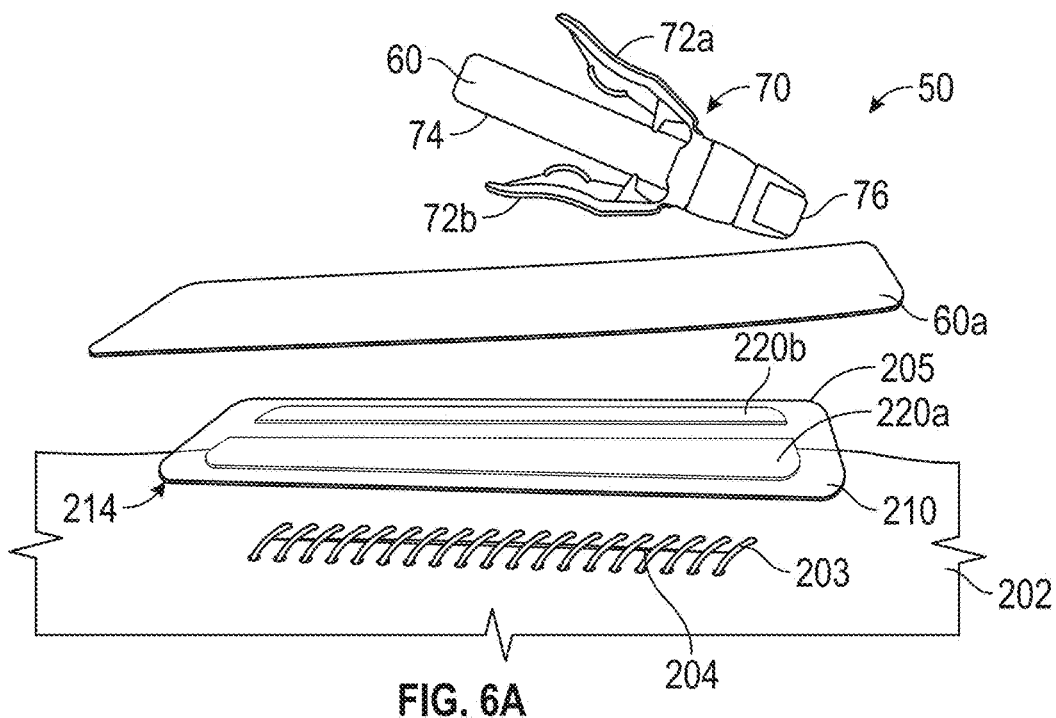
FIGS. 6A-6C is a schematic representation of a dermal system as described in at least one embodiment herein.

FIG. 6A schematically represents the dermal system 50 for closing a wound 204 which includes a dermal patch 205, a separate liquid topical skin adhesive 60, and an adhesive applicator 70 for storing and delivering the separate liquid topical adhesive 60 to the wound 204 and skin 202. The wound 204 is shown closed and including a suture 203 prior to the application of the dermal patch 205. The dermal patch 205 includes a pair of parallel medicament depots 220a, 220b being spaced a sufficient distance (e.g., about 0.5-1 cm) to not overlap any portion of the wound 204 and/or the suture fastener 203. The dermal patch 205 includes an adhesive layer 214 on the bottom side thereof to adhere the patch 205 to at least the surrounding skin 202 of the wound 204.

Once the dermal patch 205 is positioned and/or centered on the wound 4, a separate topical adhesive 60 is applied over the patch 205 and beyond the outer edges of the patch 205 to create a film 60a which covers and seals the dermal patch 205 and the wound 4 from external contaminants and moisture. The applicator 70 includes a pair of opposing bite wings 72a, 72b which are positioned on opposite sides of a reservoir 74 designed to store the topical adhesive prior to use. Squeezing of the bite wings 72a, 72b forces the adhesive 60 out of the reservoir 74 and through the roller 76 to be rolled onto the patch 205 and surrounding skin 202 to form a wet film which will quickly dry into a film 60a. Because the support layer 210 of the dermal patch 205 is porous, the liquid adhesive 60 can penetrate the pores and seal the patch 205 to the skin 202 and the wound 204. The dried adhesive films forms a barrier from infectious materials such as microbes and a moisture barrier to keep the wound dry from liquids.

Figure 6B:
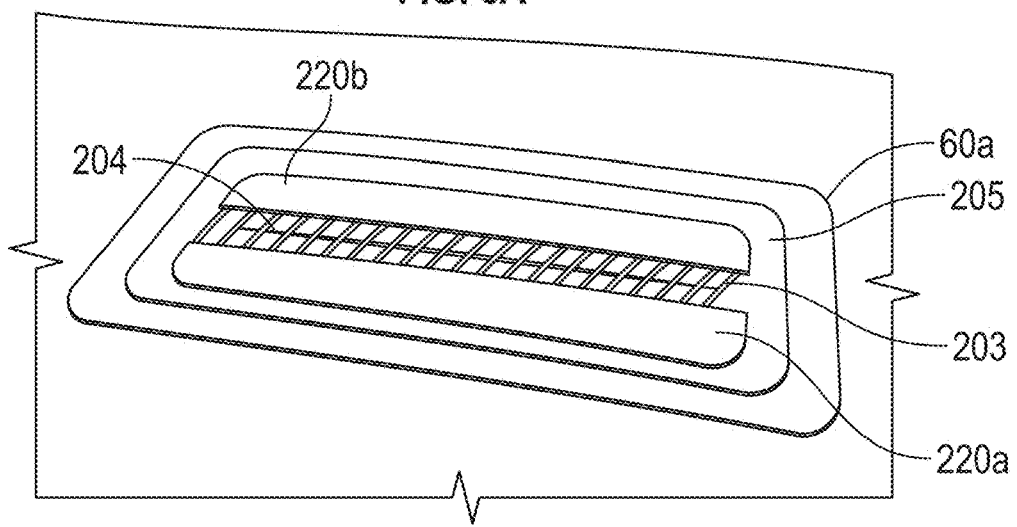
Figure 6C:
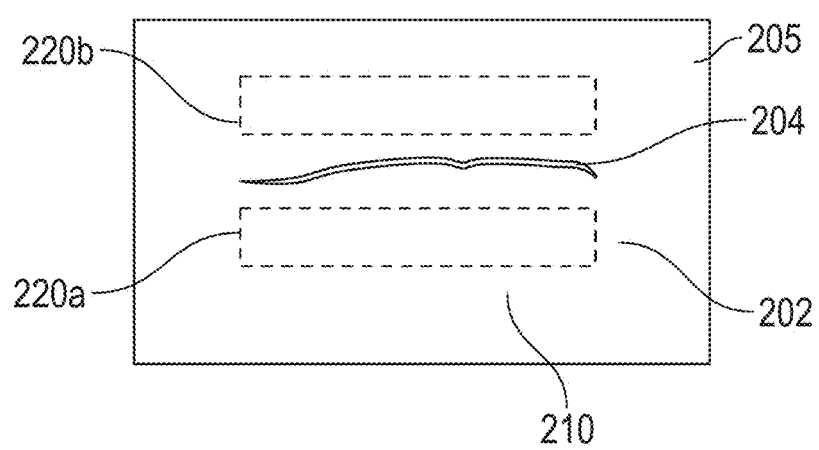

As shown in FIGS. 6B and 6C, at least the patch 205 and the adhesive film 60a are transparent allowing the sutured closed wound 204 to remain visible through the multilayer patch 205 during the healing and/or medicament delivery process. As further shown in FIG. 6B, in some embodiments, the medicament depots 220a, 220b may include a color or marking which may act as a guide for proper placement of the wound therebetween. Alternatively, as shown in FIG. 6C, in some embodiments, the depots 220a, 220b may be transparent as well.

The separate liquid adhesive 60 may be any suitable topical adhesive. In some embodiments, the separate topical adhesive is an activatable and/or polymerizable adhesive, such a cyanoacrylate adhesive. In some embodiments, the separate liquid adhesive is composed of monomeric 2-octyl cyanoacrylate adhesive with a quaternary ammonium salt as a polymerization accelerant. In the preferred embodiment, the adhesive chemically breaks down via hydrolysis over the period of 10-14 days and can be readily manually peeled off the skin along with the patch.

In some embodiments, the dermal system may include a dermal patch including a porous support layer including a polymeric medicament depot including a non-opioid medicament formulation, and a separate cyanoacrylate topical skin adhesive. The porous support layer may be a mesh or film. The polymeric depot may include an acrylate polymer. The non-opioid medicament formulation may be an anesthetic formulation, such as a bupivacaine formulation. The polymeric medicament depots may be covered with a non-porous barrier layer.

Figure 7:
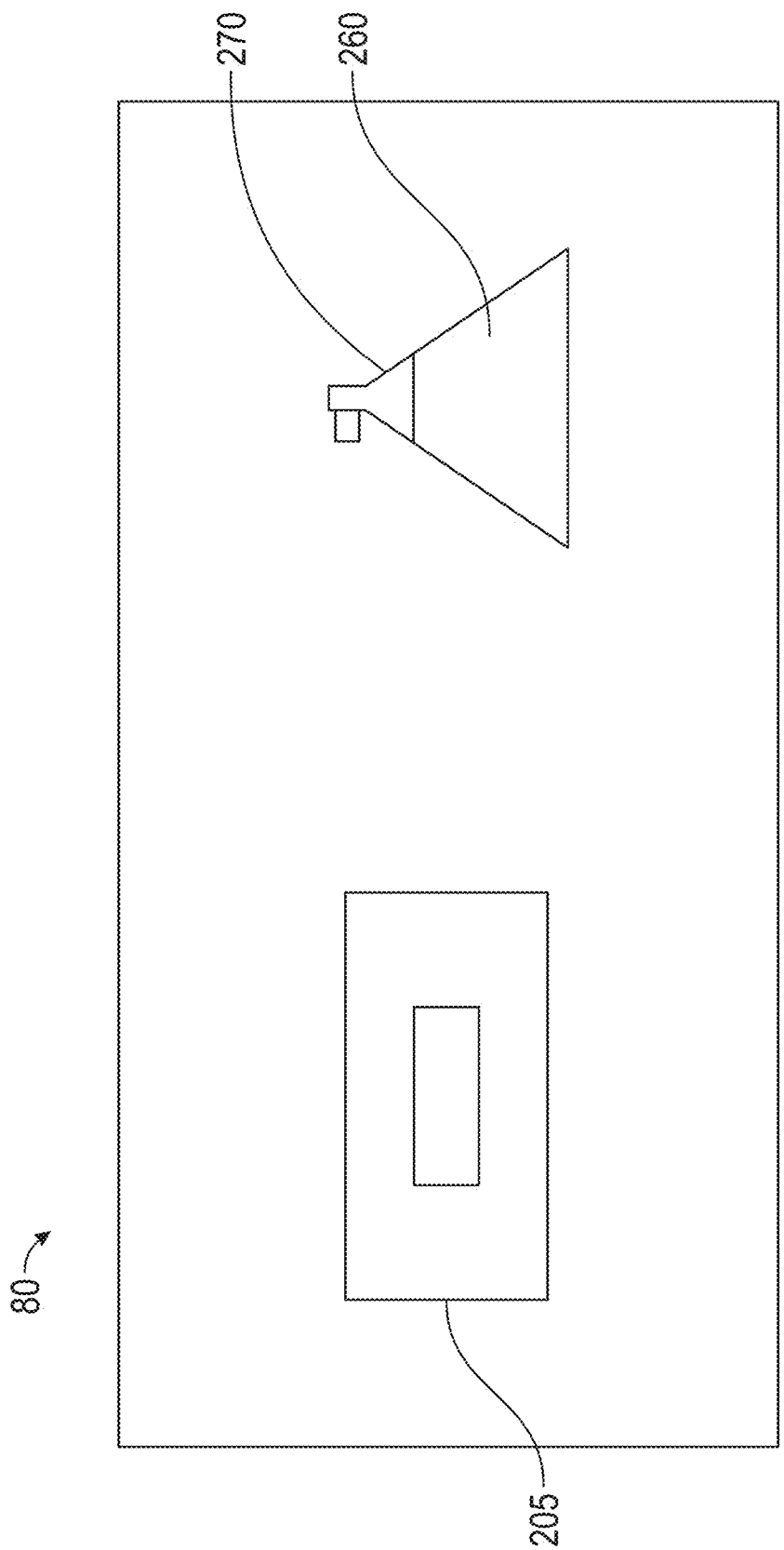
FIG. 7 is a schematic view of a dermal kit as described in at least embodiment herein.

FIG. 7 depicts a wound closing kit 80 including at least a dermal patch 205 and a separate adhesive 60 configured to be applied over the dermal patch 205 on the skin. The adhesive 260 is stored in applicator 270, such as a spray or roller applicator. Any of the dermal patches and adhesives described herein may be part of the wound closing kit. In addition, the kits may include a wound fastener such as a suture (with or without needle), butterfly bandages, staples, pins, and the like. In some embodiments, the kits may further include a plurality of separate medicament depots designed to be inserted and replaced from the dermal patch after proper positioning over a wound.

Methods of treating a wound include initially closing the wound, possibly applying a fastener to maintain the closure of the wound. Next, a bottom side of any of the dermal patches as provided herein may be positioned on the wound. If the bottom side includes a release liner, then the liner is to be removed prior to positioning of the patch. An adhesive layer of the patch can be used to adhere at least a portion of the patch to the skin and/or wound. Once the patch is properly placed and adhered to the skin and/or wound, with the medicament depot positioned either on the wound or laterally on either side of the wound, a separate liquid topical skin adhesive can be applied over the entirety of the dermal patch including the medicament depots and the barrier layers and the to the skin around the patch. The surface area of the liquid adhesive before and after drying being greater than the surface area of the patch. In the event the liquid adhesive needs to be activated, the next step is to activate the separate adhesive and allow the adhesive to dry to form a non-porous impermeable film layer over the dermal patch and the wound. The non-porous impermeable film layer sealing the patch over the wound. Next the delivery of any of the medicaments provided herein occurs for at least 3 days or at least 7 days. Removal of the patch may occur after healing of the wound.

In some embodiments, the dermal patch is a topical, non-opioid patch for postoperative wound closure and localized pain management.

A dermal patch, dermal system, surgical kit, and/or method as provided herein may be particularly beneficial in treating (e.g., reducing or blocking post-operative pain, infection, swelling, bleeding, etc.) a wound, and particularly a closed surgical incisional wound postoperatively, associated with one or more of the following non-limiting surgical procedures: C-section, tubal ligation, colectomy, bariatric procedures (e.g., gastric bypass, biliopancreatic diversion with duodenal switch (BPD-DS), roux-en-Y gastric bypass (RYGB), sleeve gastrectomy, etc.), hernia repair procedures (e.g., inguinal hernia repair, ventral hernia repair, umbilical hernia repair, etc.), hysterectomy, ostomy, hemorrhoidectomy, sacrocolpopexy, oophorectomy, myomectomy, appendectomy, rectopexy, small bowel resection, rectal resection, partial gastrectomy, and any combination thereof.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplification of embodiments. Those skilled in the art will envision other modifications within the scope and spirit of the claims appended hereto.

The invention may be further described by reference to the following numbered paragraphs:

1. A dermal patch for treating a wound in a patient's skin, the dermal patch characterized by a support layer and at least one medicament depot attached to the support layer. The support layer has a top side and a bottom side opposite the top side. The bottom side of the support layer is configured to face a skin of a patient. The at least one medicament depot includes an effective amount of at least one medicament for treating a wound in the skin of the patient. The at least one medicament depot is made of an acrylate polymer including at least one an acrylate moiety and a polyalkylene glycol moiety.

2. The dermal patch according to numbered paragraph 1, wherein the support layer is a porous support layer selected from a porous film or a porous mesh.

3. The dermal patch according to numbered paragraphs 1-2, where the acrylate moiety is derived from or includes methacrylate.

4. The dermal patch according to numbered paragraphs 1-3, where the polyalkylene glycol moiety is derived from or includes polyethylene glycol with repeating units from 1 to 100.

5. The dermal patch according to numbered paragraphs 1-4, wherein the acrylate polymer is polyethylene glycol methyl ether methacrylate.

6. The dermal patch according to numbered paragraph 1-2, wherein the acrylate polymer is a copolymer of Formula I as follows:

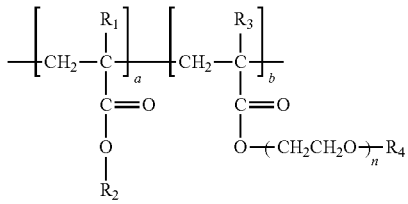

wherein
a is from 20 to 1000,
b is from 20 to 1000,
n is from 1 to 200,
$R_1$ and $R_3$ are independently hydrogen or a $C_1$-$C_4$ hydrocarbon;
$R_2$ is a $C_1$-$C_{18}$ hydrocarbon or a hetero group containing, F, Cl, Br, I, N, P, Si and O, and
$R_4$ is hydrogen, a $C_1$-$C_{18}$ hydrocarbon or a hetero group containing, F, Cl, Br, I, N, P, Si and O.

7. The dermal patch according to numbered paragraphs 6, wherein $R_2$ and $R_4$ of Formula I are independently a $C_1$-$C_{18}$ hydrocarbon.

8. The dermal patch according to numbered paragraphs 6-7, wherein $R_1$, $R_3$, or $R_4$ of Formula I is a hydrogen or methyl group (—$CH_3$), and $R_2$ of Formula I is a butyl group (—$C_4H_9$).

9. The dermal patch according to numbered paragraphs 6-8, wherein the acrylate polymer is a copolymer derived from or including polyethylene glycol methyl ether methacrylate and butyl methacrylate.

10. The dermal patch according to numbered paragraphs 1-9, wherein the medicament depot is made from a combination of the acrylate polymer and an additional composition including a propylene glycol, glycerin, or both.

11. The dermal patch according to numbered paragraphs 1-10, wherein the at least one medicament is an anesthetic.

12. The dermal patch according to numbered paragraphs 11, wherein the anesthetic is bupivacaine free base or a bupivacaine salt including bupivacaine HCl.

13. The dermal patch according to numbered paragraphs 1-12, wherein the at least one medicament depot is configured to release the anesthetic for at least 3 days.

14. The dermal patch according to numbered paragraphs 1-13, wherein the at least one medicament depot is configured to release the anesthetic at a rate of 1 ug/cm2/h to 100 ug/cm2/h.

15. The dermal patch according to numbered paragraphs 1-14, wherein the at least one medicament depot includes 0.1 mg/cm2 to 20 mg/cm2 of an anesthetic.

16. The dermal patch according to numbered paragraphs 1-15, wherein: the bottom side of the porous support layer extends between an inner portion and an outer portion, the inner portion of the bottom side is configured to cover the wound and the outer portion of the bottom side is configured to cover the skin surrounding the wound; and the at least one medicament depot has a top side and a bottom side opposite the top side, the bottom side of the at least one drug depot is configured to face the skin of the patient.

17. The dermal patch according to numbered paragraphs 1-16, further comprising a non-porous barrier layer on the top side of the at least one medicament depot, wherein: the non-porous barrier layer is positioned between the top side of the at least one medicament depot and the bottom side of the support layer; or the at least one medicament depot is positioned between the non-porous barrier layer and the top side of the support layer.

18. A topical dermal system for treating a closed wound, the topical system comprising: a dermal patch according to any of the numbered paragraphs 1-17; and a separate skin adhesive configured to be applied over the dermal patch to seal the dermal patch over the closed wound.

19. A method of treating a wound comprising: positioning a dermal patch according to any of the numbered paragraphs 1-17 over a wound; and applying a separate topical adhesive over the dermal patch, the wound, and skin surrounding the wound to seal the dermal patch over the wound forming a sealed dermal system.

20. A kit for treating a wound in a patient's skin, the kit comprising: a dermal patch according to any of the numbered paragraphs 1-17; and a separate topical adhesive configured to be applied over the dermal patch to seal the dermal patch over the closed wound.

EXAMPLES

Example 1

A base acrylate copolymer for a medicament depot was formed from a first monomer having an acrylate moiety, such as n-butyl methacrylate, and a second monomer having a polyalkylene glycol moiety, such as methyl ether of polyethylene glycol methacrylate. The base acrylate copolymer for the transdermal release of a medicament was synthesized as follows:

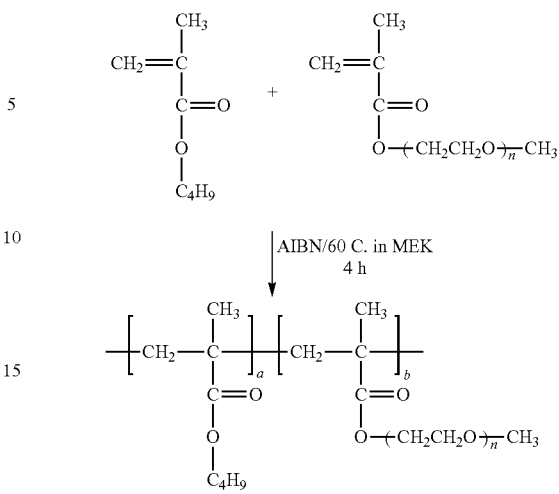

In a 20 mL vial was charged 2.0 g of poly(ethylene glycol) methyl ether methacrylate (Mw 500), 3.0 g of n-butyl methacrylate, 5 mL methyl ethyl ketone and 20.0 mg of 2,2'-Azobis(2-methylpropionitrile) (AIBN) initiator. The vial was sealed and purged with nitrogen for 5 minutes. The content was heated in a water bath for 4 hours. The acrylate copolymer was purified by precipitation in hexanes from MEK solution three times. The acrylate copolymer was dried in vacuum overnight to obtain a tacky polymer.

Example 2

Figure 8:
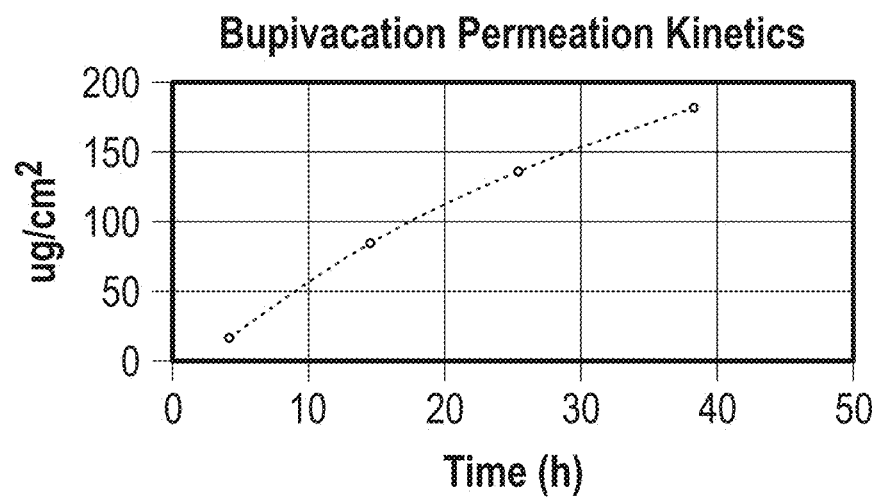
FIGS. 8-13 are each a graph representing permeation kinetics of a non-opioid medicament as described in at least one embodiment herein.

A medicament depot for transdermal release of a medicament to a wound was formed from the acrylate copolymer of Example 1 combined with an anesthetic, such as bupivacaine. Particularly, 0.344 g of the acrylate copolymer from Example 1 and 90.3 mg of bupivacaine free base were mixed in 4 mL of isopropanol. The solvent was removed on a PTFE tray inside a chemical hood. The residual solvent was further removed under high vacuum. The in vitro permeation of bupivacaine through porcine skin was carried out with a Franz diffusion cell with flux area of 0.63 $cm^2$ and 5 mL of media volume. The drug formulation film was applied to porcine skin on the donor side; the PBS solution (pH=7.4) in contact with the skin was on the acceptor side. The cell temperature was kept at 37° C. with circulating water. Aliquots of PBS solution were taken at different time points and analyzed with HPLC for amount of accumulative drug diffused through the skin. The drug fluxed with time as shown in FIG. 8. The average flux rate was 5.0 ug/$cm^2$/h. The overall drug release was over 180 ug/$cm^2$ over 72 hours.

Example 3

A base acrylate copolymer for a medicament depot was formed from an acrylate monomer having a first polyalkylene glycol moiety. In a 20 mL vial was charged 5.0 g of poly(ethylene glycol) methyl ether methacrylate (Mw 500), 5 mL ethanol and 20.0 mg of AIBN. The vial was sealed and purged with nitrogen for 5 minutes. The content was heated in a water bath for 1 hours. The polymer was purified by precipitation in hexanes from MEK solution five times. The polymer was dried in vacuum overnight to obtain a tacky polymer (PolyPEG-500 MEMA).

Example 4

Various medicament depots for transdermal release of a medicament to a wound were formed from the base acrylate copolymer of Example 3 (PolyPEG-500 MEMA) combined with an anesthetic, such as bupivacaine, and one or both of a plasticizer and an alkylene glycol. Particularly, the base acrylate copolymer of Example 3 (PolyPEG-500 MEMA) was blended with bupivacaine free base, glycerin and/or propylene glycol in isopropanol alcohol and casted on PET film (0.001" thickness) in an area of 1.13 cm² to achieved 5 mg bupivacaine/cm² after removing the isopropanol alcohol solvent. The three formulation compositions of the medicament depots are listed in Table 1.

TABLE 1

Bupivacaine Formulations

| Component | Formulation 1 | Formulation 2 | Formulation 3 |
|---|---|---|---|
| bupivacaine | 5.0% | 5.0% | 5.0% |
| PolyPEG-500 MEMA | 63.3% | 63.3% | 63.3% |
| glycerin | 25.4% | 31.7% | 0.0% |
| propylene glycol | 6.3% | 0.0% | 31.7% |

Figure 9:
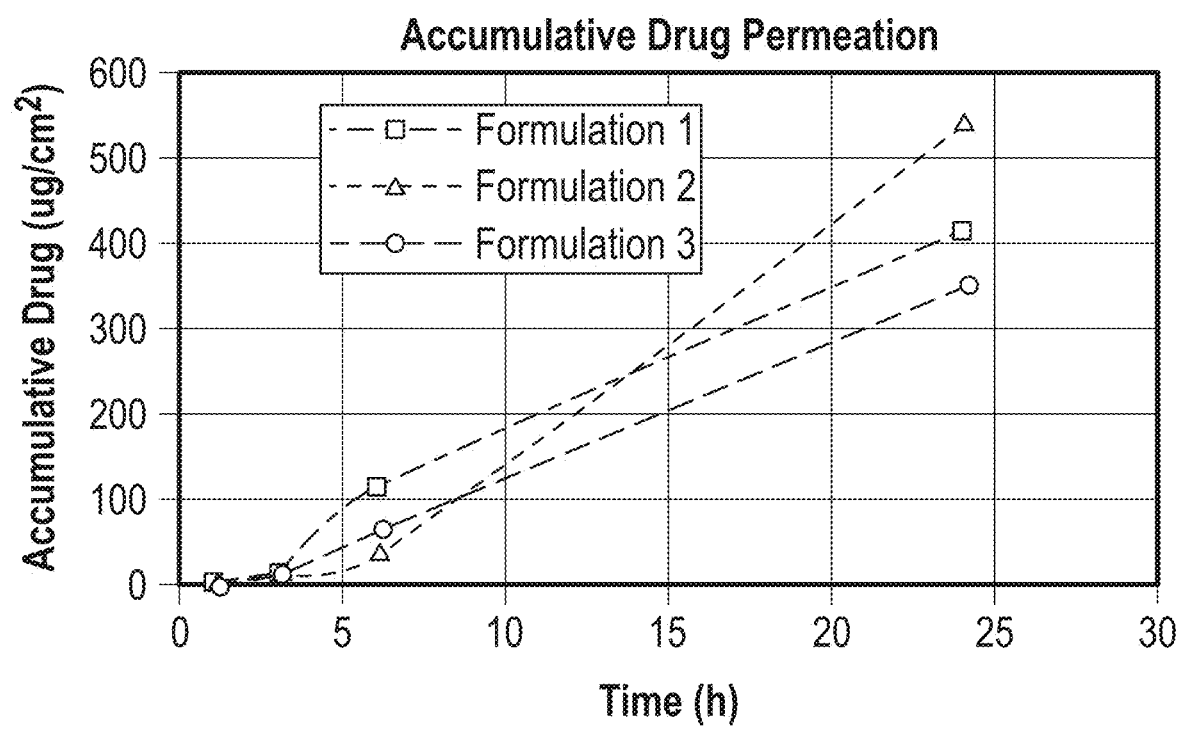

The in vitro permeation of bupivacaine through porcine skin was carried out with a Franz diffusion cell with flux area of 0.63 cm² and 5 mL of media volume. The medicament depot was applied to porcine skin on the donor side; the PBS solution (pH=7.4) in contact with the skin was on the acceptor side. The cell temperature was kept at 32° C. with circulating water. Aliquots of PBS solution was taken at different time points and analyzed with HPLC for amount of accumulative medicament diffused through the porcine skin. The results are summarized in FIG. 9. The average flux rate ranged from about 5.0 ug/cm²/h to about 20.0 ug/cm²/h, particularly over the first 24 hours. The accumulative medicament release ranged from about 300 ug/cm² over the first 24 hours to about 600 ug/cm² over the first 24 hrs.

Example 5

Various medicament depots for transdermal release of a medicament to a wound were formed from the base acrylate copolymer of Example 1 blended with a medicament, such as bupivacaine, and one or both of a plasticizer and an alkylene glycol. Particularly, the base acrylate copolymer of Example 1 was blended with bupivacaine free base, glycerin and/or propylene glycol in isopropanol alcohol and casted on PET film (0.001" thickness) in an area of 1.13 cm² to achieved a drug depot density of about 2.5 mg bupivacaine/cm² and 1.25 mg bupivacaine/cm², respectively, after removing the isopropanol alcohol solvent. The two formulation compositions of the medicament depots are listed in Table 2.

TABLE 2

| Component | Formulation 4 | Formulation 5 |
|---|---|---|
| bupivacaine free base | 2.5% | 5.0% |
| Polymer in example 1 | 65.0% | 63.33% |
| Glycerin | 26.0% | 25.33% |
| Propylene glycol | 6.5% | 6.33% |
| Total | 100.0% | 100.0% |

Figure 10:
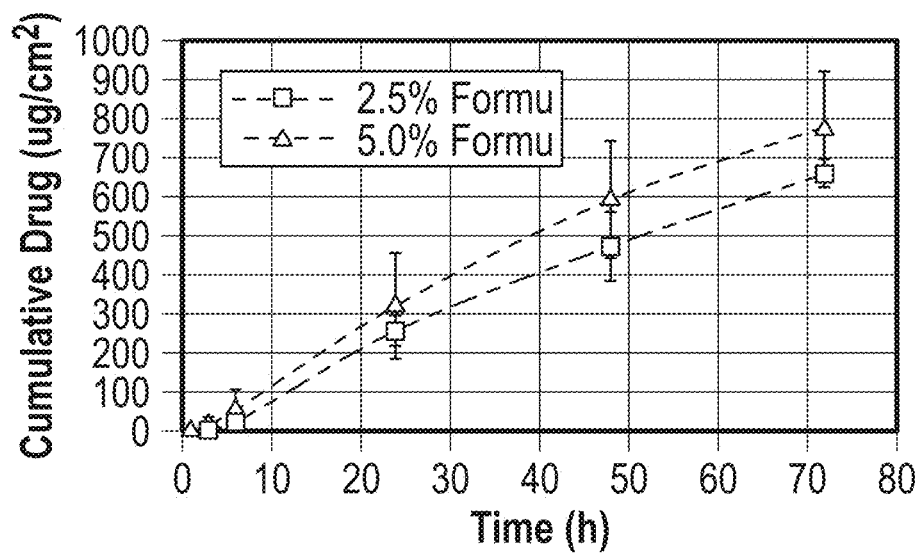

The in vitro permeation of bupivacaine through porcine skin was carried out with a Franz diffusion cell with flux area of 0.63 cm² and 5 mL of media volume. The medicament depot was applied to porcine skin on the donor side; the PBS solution (pH=7.4) in contact with the skin was on the acceptor side. The cell temperature was kept at 32° C. with circulating water. Aliquots of PBS solution was taken at different time points and analyzed with HPLC for amount of accumulative medicament diffused through the porcine skin. The results are summarized in FIG. 10. The average flux rate ranged from about 5.0 ug/cm²/h to about 20.0 ug/cm²/h, and more particularly from about 10.0 ug/cm²/h to about 15.0 ug/cm²/h over the first 72 hours. The accumulative medicament release ranged from about 600 ug/cm² over the first 72 hours to about 800 ug/cm² over the first 72 hrs.

Example 6

Figure 11:
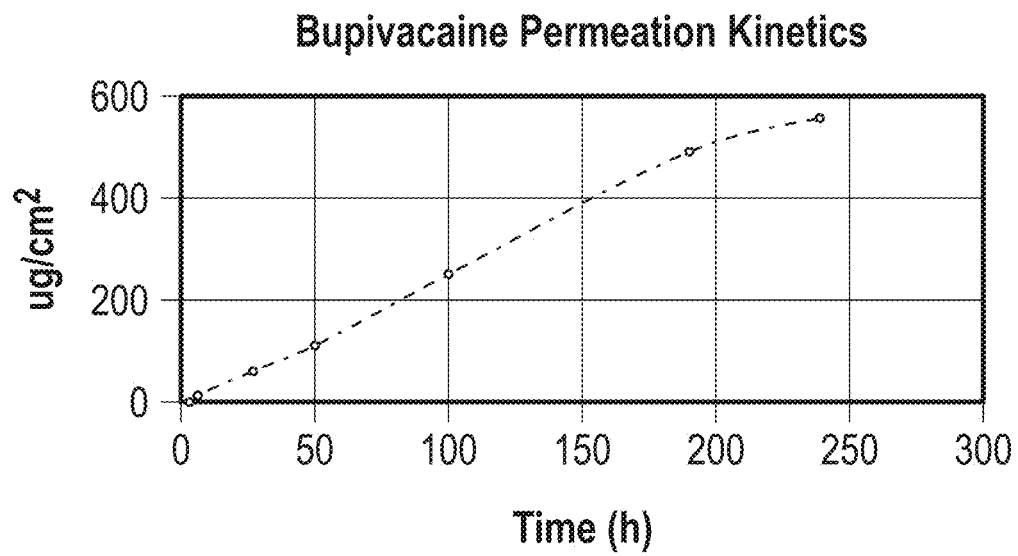
Figure 12:
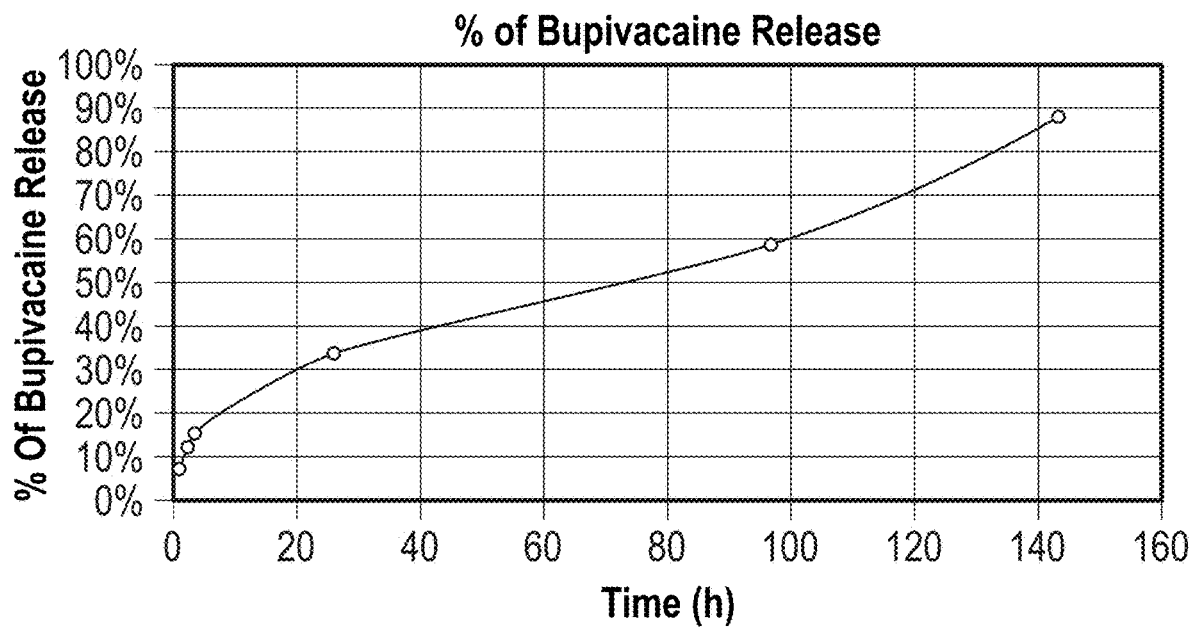

Two complimentary precursors were combined to form a hydrogel medicament depot. A 20 mL vial was charged with 90 mg of bupivacaine hydrochloride, 159 mg of 4-arm PEG-SG with a molecular weight of 2000. The mixture was dissolved in 1.0 mL of methanol. Another 20 mL vial was charged with 13.13 mg of sodium hydroxide and 317 mg of PEG diamine. The mixture was dissolved in 1.0 mL of methanol. The two solutions were mixed. The gel was formed in about 5 minutes and gelation continued for about 15 h. The formed gel was dried in a vacuum oven at 50 C for about 5 h. About 10 mg of the dried gel was suspended in 10 mL pH 7.4 PBS at 37° C. Aliquot was taken at different point and analyzed with HPLC for the amount of bupivacaine released with time. The drug fluxed with time as shown in FIG. 11. The average flux rate was about 1.5-2.0 ug/cm²/h over 10 days. The % of release of bupivacaine is shown in FIG. 12.

Example 7

A medicament depot for transdermal release of a medicament to a wound was formed from combining bupivacaine with an acrylate terpolymer including or derived from hexyl methacrylate, vinyl pyrrolidone, and vinyl acetate. Polysorbate-80 and glycerol trioctanoate was also added.

Figure 13:
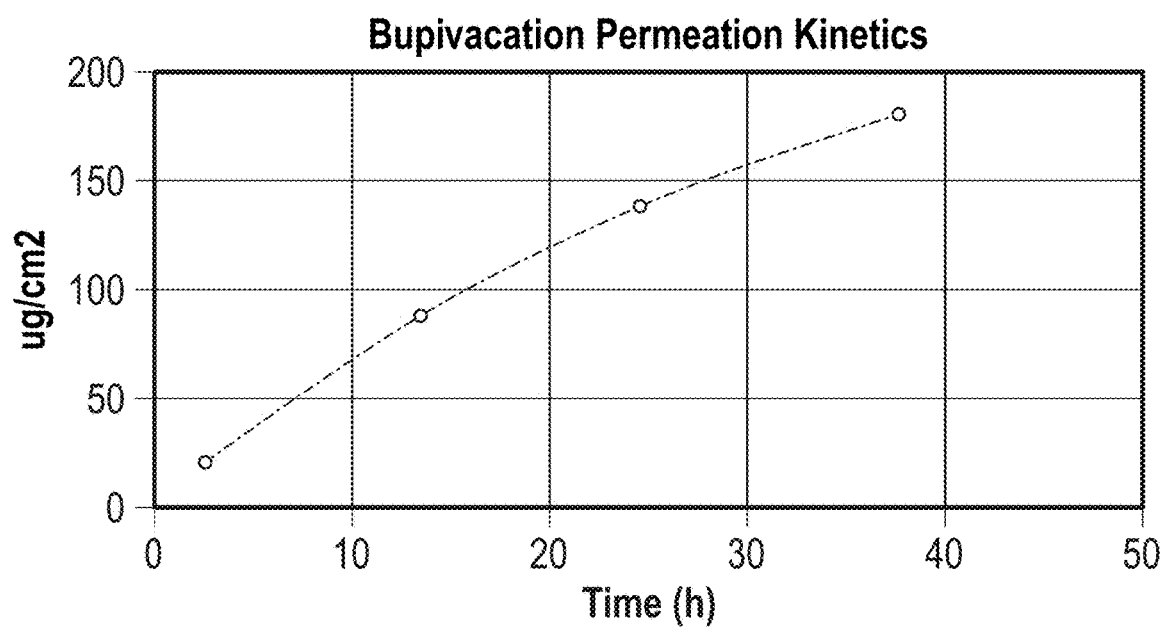

The drug fluxed with time as shown in FIG. 13. The average flux rate was about 4.0-5.0 ug/cm²/h. The overall drug release was over about 200 ug/cm² over 48 hours. The formulation composition of the medicament depot of Example 7 is listed in Table 3 below.

| Ingredient | Percentage |
|---|---|
| Bupivacaine | 12% |
| Acrylate Copolymer | 55% |
| Poly Sorbate-80 | 12% |
| Glycerol trioctanoate | 21% |

What is claimed is:
1. A dermal patch for treating a wound in a patient's skin, the dermal patch comprising:
   a support layer having a top side and a bottom side opposite the top side, wherein the bottom side of the support layer is configured to face a skin of a patient; and
   a medicament depot attached to the support layer, the medicament depot including an effective amount of at least one medicament for treating a wound in the skin of the patient, wherein the medicament depot is made of a copolymer of Formula I as follows:

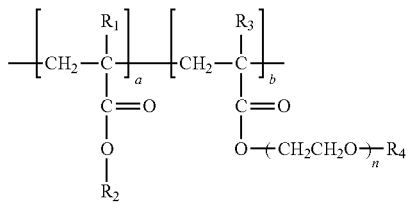

wherein
a is from 20 to 1000,
b is from 20 to 1000,
n is from 1 to 200,
$R_1$ and $R_3$ are independently hydrogen or a $C_1$-$C_4$ hydrocarbon;
$R_2$ is a $C_1$-$C_{18}$ hydrocarbon or a hetero group containing, F, Cl, Br, I, N, P, Si and O, and
$R_4$ is hydrogen, a $C_1$-$C_{18}$ hydrocarbon or a hetero group containing, F, Cl, Br, I, N, P, Si and O.

2. The dermal patch according to claim 1, wherein the support layer is a porous support layer selected from a porous film or a porous mesh.

3. The dermal patch according to claim 1, wherein $R_2$ and $R_4$ of Formula I are independently a $C_1$-$C_{18}$ hydrocarbon.

4. The dermal patch according to claim 1, wherein $R_1$, $R_3$, or $R_4$ of Formula I is a hydrogen or methyl group (—$CH_3$), and $R_2$ of Formula I is a butyl group (—$C_4H_9$).

5. The dermal patch according to claim 1, wherein the medicament depot further comprises an additional composition including a propylene glycol, glycerin, or both.

6. The dermal patch according to claim 1, wherein the at least one medicament is an anesthetic.

7. The dermal patch according to claim 6, wherein the anesthetic is bupivacaine free base or a bupivacaine salt including bupivacaine HCl.

8. The dermal patch according to claim 6, wherein the at least one medicament depot is configured to release the anesthetic for at least 3 days.

9. The dermal patch according to claim 6, wherein the at least one medicament depot is configured to release the anesthetic at a rate of 1 ug/cm²/h to 100 ug/cm²/h.

10. The dermal patch according to claim 6, wherein the at least one medicament depot includes 0.1 mg/cm² to 20 mg/cm² of an anesthetic.

11. The dermal patch according to claim 1, wherein:
the bottom side of the porous support layer extends between an inner portion and an outer portion, the inner portion of the bottom side is configured to cover the wound and the outer portion of the bottom side is configured to cover the skin surrounding the wound; and
the at least one medicament depot has a top side and a bottom side opposite the top side, the bottom side of the at least one drug depot is configured to face the skin of the patient.

12. The dermal patch according to claim 11, further comprising a non-porous barrier layer on the top side of the at least one medicament depot, wherein:
the non-porous barrier layer is positioned between the top side of the at least one medicament depot and the bottom side of the support layer; or
the at least one medicament depot is positioned between the non-porous barrier layer and the top side of the support layer.

13. A topical dermal system for treating a closed wound, the topical system comprising:
a dermal patch including
a support layer having a top side and a bottom side opposite the top side, wherein the bottom side of the support layer is configured to face a skin of a patient; and
a medicament depot attached to the support layer, the medicament depot including an effective amount of at least one medicament for treating a wound in the skin of the patient, wherein the medicament depot is made of a copolymer of Formula I as follows:

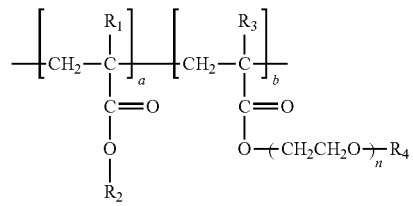

wherein
a is from 20 to 1000,
b is from 20 to 1000,
n is from 1 to 200,
$R_1$ and $R_3$ are independently hydrogen or a $C_1$-$C_4$ hydrocarbon;
$R_2$ is a $C_1$-$C_{18}$ hydrocarbon or a hetero group containing, F, Cl, Br, I, N,P, Si and O, and
$R_4$ is hydrogen, a $C_1$-$C_{18}$ hydrocarbon or a hetero group containing, F, Cl, Br, I, N,P, Si and O; and
a separate skin adhesive configured to be applied over the dermal patch to seal the dermal patch over the closed wound.

14. A method of treating a wound comprising:
positioning a dermal patch over a wound, the dermal patch including
a support layer having a top side and a bottom side opposite the top side, wherein the bottom side of the support layer is configured to face a skin of a patient; and
a medicament depot attached to the support layer, the medicament depot including an effective amount of at least one medicament for treating a wound in the skin of the patient, wherein the medicament depot is made of a copolymer of Formula I as follows:

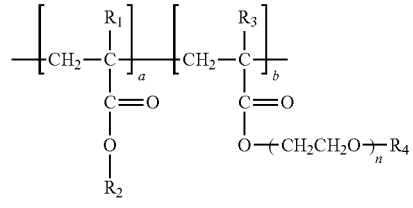

wherein
a is from 20 to 1000,
b is from 20 to 1000,
n is from 1 to 200, $R_1$ and $R_3$ are independently hydrogen or a $C_1$-$C_4$ hydrocarbon;

$R_2$ is a $C_1$-$C_{18}$ hydrocarbon or a hetero group containing, F, Cl, Br, I, N,P, Si and O, and $R_4$ is hydrogen, a $C_1$-$C_{18}$ hydrocarbon or a hetero group containing, F, Cl, Br, I, N,P, Si and O;

applying a separate topical adhesive over the dermal patch, the wound, and skin surrounding the wound to seal the dermal patch over the wound forming a sealed dermal system.

15. A kit for treating a wound in a patient's skin, the kit comprising:

a dermal patch including a support layer having a top side and a bottom side opposite the top side, wherein the bottom side of the support layer is configured to face a skin of a patient; and a medicament depot attached to the support layer, the medicament depot including an effective amount of at least one medicament for treating a wound in the skin of the patient, wherein the medicament depot is made of a copolymer of Formula I as follows:

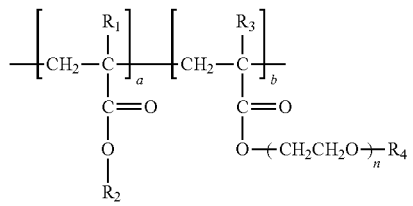

wherein a is from 20 to 1000, b is from 20 to 1000, n is from 1 to 200, $R_1$ and $R_3$ are independently hydrogen or a $C_1$-$C_4$ hydrocarbon;

$R_2$ is a $C_1$-$C_{18}$ hydrocarbon or a hetero group containing, F, Cl, Br, I, N,P, Si and O, and $R_4$ is hydrogen, a $C_1$-$C_{18}$ hydrocarbon or a hetero group containing, F, Cl, Br, I, N,P, Si and O; and a separate topical adhesive configured to be applied over the dermal patch to seal the dermal patch over the closed wound.

* * * * *